(12) United States Patent
Bryan et al.

(10) Patent No.: US 9,613,116 B2
(45) Date of Patent: Apr. 4, 2017

(54) IDENTIFYING AND FORMATTING DATA FOR DATA MIGRATION

(71) Applicant: Workday, Inc., Pleasanton, CA (US)

(72) Inventors: Wesley Bryan, McKinney, TX (US); Scott Ingulli, Tampa, FL (US)

(73) Assignee: Workday, Inc., Pleasanton, CA (US)

( * ) Notice: Subject to any disclaimer, the term of this patent is extended or adjusted under 35 U.S.C. 154(b) by 166 days.

(21) Appl. No.: 14/081,118

(22) Filed: Nov. 15, 2013

(65) Prior Publication Data
US 2015/0142858 A1 May 21, 2015

(51) Int. Cl.
*G06F 17/30* (2006.01)

(52) U.S. Cl.
CPC .............................. *G06F 17/30569* (2013.01)

(58) Field of Classification Search
CPC .................................................. G06F 17/30569
USPC ......................................................... 707/809
See application file for complete search history.

(56) References Cited

U.S. PATENT DOCUMENTS

| | | | |
|---|---|---|---|
| 6,324,568 B1* | 11/2001 | Diec | G06F 17/3089 707/E17.116 |
| 6,356,901 B1* | 3/2002 | MacLeod | G06F 17/30563 |
| 6,397,308 B1* | 5/2002 | Ofek | G06F 11/1451 707/999.202 |
| 6,574,635 B2* | 6/2003 | Stauber | G06F 9/465 707/704 |
| 8,285,681 B2* | 10/2012 | Prahlad | G06F 17/3002 707/640 |
| 8,560,568 B2* | 10/2013 | Gilder | G06F 17/30578 707/602 |
| 2004/0186860 A1* | 9/2004 | Lee | G06F 9/542 |
| 2008/0109283 A1* | 5/2008 | Binnie | G06Q 10/06316 705/7.26 |
| 2010/0332561 A1* | 12/2010 | Prahlad | G06F 11/1458 707/812 |
| 2012/0041990 A1* | 2/2012 | Kreindlina | G06F 17/30554 707/805 |
| 2012/0089562 A1* | 4/2012 | Deremigio | G06F 17/30563 707/602 |
| 2012/0136936 A1* | 5/2012 | Quintuna | G06F 21/604 709/204 |

(Continued)

OTHER PUBLICATIONS

Raj, Pethuru, "Chapter 3: Enriching the 'Integration as a Service' Paradigm for the Cloud Area", Cloud Computing: Principles and Paradigms, John Wiley & Sons, Jan. 3, 2011, pp. 57-96.*

(Continued)

*Primary Examiner* — Robert Stevens
(74) *Attorney, Agent, or Firm* — Van Pelt, Yi & James LLP

(57) ABSTRACT

Data formatting, migration and corresponding application acceptance for cloud-based applications may include various operations. One example operation may include identifying a data object eligible for migration to a cloud application and identifying a number of field groups linked to the data object, each of the field groups may include at least one data field. The operation may further provide receiving the field groups at a data formatting application operated on a remote cloud application server. Also, a format of the field group may be converted to a format associated with a simple data set of the cloud application for data migration purposes.

24 Claims, 26 Drawing Sheets

(56) References Cited

U.S. PATENT DOCUMENTS

| | | | | |
|---|---|---|---|---|
| 2012/0221522 A1* | 8/2012 | Allman | ............ | G06F 17/30578 707/624 |
| 2013/0110884 A1* | 5/2013 | Eakins | ................ | G06F 17/246 707/809 |
| 2013/0173539 A1* | 7/2013 | Gilder | ............... | G06F 17/30578 707/622 |
| 2013/0205283 A1* | 8/2013 | Warren | .................... | G06F 8/41 717/141 |
| 2013/0325789 A1* | 12/2013 | Krishnan | .......... | G06F 17/30563 707/602 |
| 2013/0339831 A1* | 12/2013 | Gulanikar | ........ | G06Q 10/06311 715/210 |
| 2014/0040182 A1* | 2/2014 | Gilder | ............... | G06F 17/30578 707/602 |
| 2014/0164315 A1* | 6/2014 | Golshan | ............ | G06F 17/30011 707/608 |
| 2015/0032415 A1* | 1/2015 | Van Cutsem | ....... | G06F 11/3476 702/187 |

OTHER PUBLICATIONS

Bernstein, Philip A., et al., "Information Integration in the Enterprise", Communications of the ACM, vol. 51, No. 9, Sep. 2008, pp. 72-79.*

Demirkan, Haluk, et al., "Leveraging the capabilities of service-oriented decision support systems: Putting analytics and big data in cloud", Decisions Support Systems, vol. 55, Issue 1, Apr. 2013, pp. 412-421.*

Frey, Sören, et al., "An Extensible Architecture for Detecting Violations of a Cloud Environment's Constraints During Legacy Software System Migration", CSMR 2011, Oldenburg, Germany, Mar. 1-4, 2011, pp. 269-278.*

Gupta, Rajeev, et al., "Enabling Active Data Archival Over Cloud", SCC 2012, Honolulu, HI, Jun. 24-29, 2012, pp. 98-105.*

Venugopal, Suresh, et al., "Effective Migration of Enterprise Applications in Multicore Cloud", UCC 2011, Melbourne, Victoria, Australia, Dec. 5-7, 2011, pp. 463-468.*

* cited by examiner

| Home | Human Resources | Dashboards | Reports | Setup |

Employees — Data Entry Mode: Rapid

Related Setup Data
- Company
- Compensation Plans
- Job Profile
- Cost Center
- Region
- Grade Profile
- Grades
- Location

[Auto Build]

Related Seed Data
- Marital Status
- Ethnicity
- State
- Country
- Municipality
- Postal Code
- Gender
- National ID Type

Other Related Data
- Open Positions
- Employees on LOA
- Contingent Worker

Reports
- Employee Count by Cost Center
- Employee Count by Location
- Employees on Leave
- Ave Salary by Cost Center

[Add] [Upsert] [Delete]

☐ Names — 710                                        [Download] [Filter ▼]

| ☐ ID · Name | First Name | Middle Name | Last Name | Suffix | First Name - Preferred | Middle Name - Preferred | Last Name - Preferred | First Name - National | Last Name - National |
|---|---|---|---|---|---|---|---|---|---|
| E10215 - Tom Cruise | Tom | | Cruise | | | | | | |
| E1124 - Adam Sandler | Adam | | Sandler | | | | | | |
| N0001 - Bill Jones | Bill | | Jones | | | | | | |

Prev    Page 1 of 1 (0 recs)    Next

| | A | B | C | D | E | F | G |
|---|---|---|---|---|---|---|---|
| 1 | ID | Name | Location Name | Cost Center Org Name 1010 | Company Org Name | Region Org Name | Business Unit Name |
| 2 | E10215 | Tom Cruise | Austin, Texas | General & Administrative CEO | Acme Inc U.S. | North America | Business Unit Name 1 |
| 3 | E11124 | Adam Sandler | Austin, Texas | General & Administrative CEO | Acme Inc U.S. | North America | Business Unit Name 1 |
| 4 | E52421 | Larry Bean | Austin, Texas | Operations: Onshore | Acme Inc U.S. | North America | Business Unit Name 1 |
| 5 | E42754 | John Doe | Austin, Texas | Operations: Onshore | Acme Inc Ltd. U.S. | Europe | Business Unit Name 2 |
| 6 | E78463 | Bill Shores | Austin, Texas | Operations: Onshore | Acme Inc Ltd. U.S. | Europe | Business Unit Name 2 |
| 7 | E45678 | Ben Affleck | London, Inland | R&D | Acme Inc Ltd. U.S. | Europe | Business Unit Name 1 |
| 8 | E45477 | Dan Johnson | Remote, US | R&D | Acme San Fran | Europe | Business Unit Name 2 |
| 9 | E12145 | Frank Oz | Austin, Texas | Client Services | Acme Inc Ltd. U.S. | Europe | Business Unit Name 1 |

FIG. 10

| | | | | | |
|---|---|---|---|---|---|
| ID - NAME | LOCATION NAME | COST CENTER ORG NAME | COMPANY ORG NAME | REGION ORG NAME | BUSINESS UNIT NAME |
| E10215 - TOM CRUISE | AUSTIN, TEXAS | GENERAL & ADMINISTRATIVE CEO | ACME INC U.S. | NORTH AMERICA | BUSINESS UNIT NAME 1 |
| E11124 - ADAM SANDLER | AUSTIN, TEXAS | GENERAL & ADMINISTRATIVE CEO | ACME INC U.S. | NORTH AMERICA | BUSINESS UNIT NAME 1 |
| E52421 - LARRY BEAN | AUSTIN, TEXAS | OPERATIONS: ONSHORE | ACME INC U.S. | NORTH AMERICA | BUSINESS UNIT NAME 1 |
| E48754 - JOHN DOE | AUSTIN, TEXAS | OPERATIONS: ONSHORE | ACME INC LTD. U.S. | EUROPE | BUSINESS UNIT NAME 2 |
| E78463 - BILL SHORES | AUSTIN, TEXAS | OPERATIONS: ONSHORE | ACME INC LTD. U.S. | EUROPE | BUSINESS UNIT NAME 2 |
| E45678 - BEN AFFLECK | LONDON, INLAND | R&D | ACME INC LTD. U.S. | EUROPE | BUSINESS UNIT NAME 1 |
| E45477 - DAN JOHNSON | REMOTE, US | R&D | ACME SAN FRAN | EUROPE | BUSINESS UNIT NAME 2 |
| E11145 - FRANK OZ | AUSTIN, TEXAS | CLIENT SERVICES | ACME INC LTD. U.S. | EUROPE | BUSINESS UNIT NAME 1 |

Employee: E10215 - Tom Cruise Page [1] 2 3 4 5

ID
ID
Name
Edit

National ID Page [1] 2 3 4 5
NID Country
NID Country Code
National ID
National ID Type
Edit

Employee: E10215 - Tom Cruise Page [1] 2 3 4 5

Manager
Employee ID of Direct Manager
Manager First Name
Manager Last Name
Edit

Time Keeper
Time Keeper Employee ID
Custom ID1
Custom ID2
Edit

Personal Data
Citizenship Country
Citizenship Status
Date of Birth
Gender
Ethnicity
Marital Status
Edit

Names
First Name
Middle Name
Last Name
Suffix
First Name (Preferred)
Middle Name (Preferred)
Last Name (Preferred)
First Name (National)
Last Name (National)
Edit

Job Profile
Job Profile
Position Name
Business Title
Employee Type
Time Type
Default Weekly Hours
Scheduled Weekly Hours
FTE
Pay Rate Type
Edit

Compensation
Compensation Effective Date
Compensation Rate
Compensation Currency
Compensation Frequency
Compensation Grade
Compensation Grade Profile
Edit

Job Dates
Hire Date
Original Hire Date
Termination Date
Continuous Service Date
Edit

Job Orgs +
Location Name
Cost Center Org
Company Org Name
Region Org Name
Business Unit Name
Edit

User and Employee ID
Employee ID
WD Userid
WD Userid Option
WD Password
WD Password Option
Edit

Military Status
Military Status
Country(Military)
Country Code (Military)
Discharge Date
Edit

1510 — Page [1][2][3][4][5]

Employee: E10215 - Tom Cruise

Home Address
Country
Country Code
Region (State)
Postal Code
Address Line #1
Address Line #2
Address Line #3
Address Line #4
Remote EE?
Edit

Home Address Municipality
Country
Country Code
Region (State)
Subregion (County)
Municipality
Submunicipality
City Subdivision
Postal Code
Edit

Work Address
Country
Country Code
Region (State)
Postal Code
Address Line #1
Address Line #2
Address Line #3
Address Line #4
Remote EE?
Edit

Work Address Municipality
Country
Country Code
Region (State)
Subregion (County)
Municipality
Submunicipality
City Subdivision
Postal Code
Edit

Email Address - Work
Email Address
Edit

Email Addresses - Other
Email Address
Type
Public
Email Address2
Type2
Public2
Edit 1520 — Page [1][2][3][4][5]

Employee: E10215 - Tom Cruise

Home Phone
Country
Country Code
International phone Code
Area Code
Phone Number
Phone Extension
Edit

Work Phone
Country
Country Code
International phone Code
Area Code
Phone Number
Phone Extension
Edit

Mobile Phone
Country
Country Code
International phone Code
Area Code
Phone Number
Phone Extension
Edit

MENU | HOME | HUMAN RESOURCES | DASHBOARDS | REPORTS | SETUP

RELATED SETUP DATA
- COMPANY
- COMPENSATION PLANS
- JOB PROFILE
- COST CENTER
- REGION
- GRADE PROFILE
- GRADES
- LOCATION

[AUTO BUILD]

RELATED SEED DATA
- MARITAL STATUS
- ETHNICITY
- STATE
- COUNTRY
- MUNICIPALITY
- POSTAL CODE
- GENDER
- NATIONAL ID TYPE

OTHER RELATED DATA
- OPEN POSITIONS
- EMPLOYEES ON LOA
- CONTINGENT WORKER

REPORTS
- EMPLOYEE COUNT BY COST CENTER
- EMPLOYEE COUNT BY LOCATION
- EMPLOYEES ON LEAVE
- AVE SALARY BY COST CENTER

---

EMPLOYEES   DATA ENTRY MODE : RAPID

[ADD] [UPSERT] [DELETE]   [DOWNLOAD] [FILTER ▼]

☐ NAMES

| ID - NAME | FIRST NAME | MIDDLE NAME | LAST NAME | SUFFIX | FIRST NAME - PREFERRED | MIDDLE NAME - PREFERRED | LAST NAME - PREFERRED | FIRST NAME - NATIONAL | LAST NAME - NATIONAL |
|---|---|---|---|---|---|---|---|---|---|
| E10215 - TOM CRUISE | TOM | | CRU | | | | | | |
| E1124 - ADAM SANDLER | ADAM | | SANDLER | | | | | | |
| N0001 - BILL JONES | BILL | | JONES | | | | | | |

1610

PREV    PAGE 1 OF 1 (0 RECS)    NEXT

HOME  DASHBOARDS  REPORTS  CORE HR

Select Object ▼  Field Group ▼  Action ▼

(Manager)

| | Employee ID of Direct Manager | Equals | Acme Inc. U.S | Search | Clear |
| | | | Manager First Name | Manager Last Name | |
| | 01001 | | Chris | Enders | |
| | 01001 | | Chris | Enders | |
| | 01001 | | Chris | Enders | |
| | 01001 | | Chris | Enders | |
| | 01001 | | Chris | Enders | |
| | 01005 | | Chuck | Sartor | |
| | 01004 | | Brad | Johnson | |
| | 01005 | | Bart | Novack | |

Employees
Allowance Plans
Business Units
Companies
Compensation Plans
Contact Addresses
Contact Email Addresses
Contact Phones
Contingent Workers
Cost Centers
Grade Profiles
Grades
Job Profiles
Locations
Open Positions
Regions E01013-Ashley Donner

IDENTIFYING AND FORMATTING DATA FOR DATA MIGRATION

TECHNICAL FIELD OF THE APPLICATION

This application relates to identifying and formatting data prior to transmitting the data to a data migration cloud application or accessing cloud applications which require access to the data in a specified format.

BACKGROUND OF THE APPLICATION

Conventionally, data migration to the cloud and related cloud applications are unorganized and often lead to data loss, data corruption, unorganized data sets and other problematic scenarios that cost the organizations money and time to correct. Specific applications exist today that provide a workable solution to establishing an application programming interface (API), receiving data required by the application and eventually forwarding the data to a cloud-based application in a format that is compatible with the application(s).

However, those programs and applications that exist as portals or user interfaces to format and upload data are not easy to use and require a certain level of user expertise. The rules, programming nomenclature and other fine details create hardship for the users who are attempting to access and comply with formats require by outsourced applications operating in the cloud.

SUMMARY OF THE APPLICATION

One embodiment of the present application may include a method that includes identifying at least one data object eligible for migration to a cloud application stored on a computer network device, identifying a plurality of field groups linked to the at least one data object, each of the plurality of field groups including at least one data field, receiving the plurality of field groups at a data formatting application operated on a remote cloud application server, identifying at least one of the plurality of field groups received at the remote cloud application server, converting a format of the at least one field group to a format associated with a simple data set of the cloud application, modifying the simple data set to include the at least one data field and storing the modified simple data set on the remote cloud application server.

Another example embodiment may provide apparatus that includes a processor configured to identify at least one data object eligible for migration to a cloud application stored on a computer network device and identify a plurality of field groups linked to the at least one data object, each of the plurality of field groups including at least one data field. The apparatus may also include a receiver configured to receive the plurality of field groups at a data formatting application operated on a remote cloud application server. The processor is further configured to identify at least one of the plurality of field groups received at the remote cloud application server, convert a format of the at least one field group to a format associated with a simple data set of the cloud application, modify the simple data set to include the at least one data field, and store the modified simple data set on the remote cloud application server.

BRIEF DESCRIPTION OF THE DRAWINGS

FIG. 1 illustrates an example object layout and selection user interface according to example embodiments of the present application.

FIG. 3 illustrates an example object link and detail page user interface according to example embodiments of the present application.

FIG. 7 illustrates a further example user interface with user profile information according to example embodiments of the present application.

FIG. 8 illustrates an example data entry configuration user interface according to example embodiments of the present application.

FIG. 10 illustrates an example data populated spreadsheet user interface according to example embodiments of the present application.

FIG. 11 illustrates an example of the resulting upserted data provided in the corresponding application user interface according to example embodiments of the present application.

FIG. 12 illustrates an example object detail page user interface according to example embodiments of the present application.

FIG. 13 illustrates an example employee object field group interface according to example embodiments of the present application.

FIG. 15 illustrates yet another example employee object field group interface according to example embodiments of the present application.

FIG. 16 illustrates an example rapid data entry interface according to example embodiments of the present application.

FIG. 21 illustrates a graphical user interface display of field groups and corresponding simple data set data corresponding to the example embodiments.

FIG. 22 illustrates another graphical user interface display of field groups and corresponding simple data set data corresponding to the example embodiments.

DETAILED DESCRIPTION OF THE APPLICATION

Figure 2:
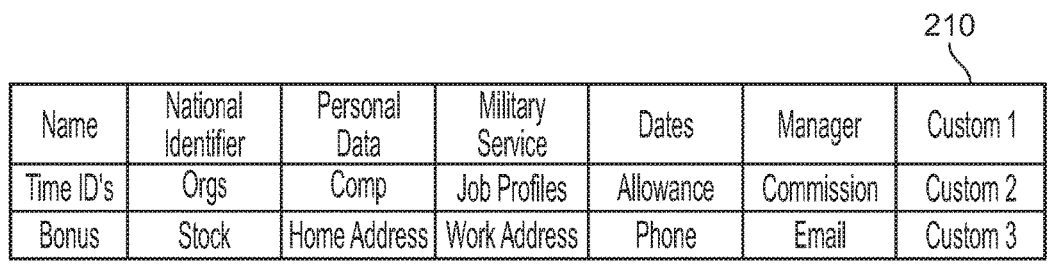
FIG. 2 illustrates an example megatab display user interface according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application provide data gathering for specific types of data objects. Large numbers of fields may be associated with a particular object. The relationships between objects may be established to provide a data lookup type and navigation among those objects. A user interface may be offered as a software application tool for a user to edit and add certain data. Once the data is gathered in an optimal manner, the data may be formatted and downloaded and potentially inserted and/or updated ("upserted") to a remote database processing system.

The objects may support a rapid entry mode of operation and a wizard mode that enables optimal data organization and related support. The field groups will be created to support field management. Object information may be edited through the user interface or through the mass data edit functionality and/or by downloading and upserting information which modifies the object. Relationships may be established based on the object name instead of identifier to support flexibility in the data manipulation. In one example, the object support interface may enable the downloading of only the fields on the field group, however, upserting may be performed on any fields of the object. Upserting may include updating information by inserting new data entries into existing fields to create an update to the existing field. However, populating new information into an existing field may not cause an update until a periodic or manually controlled update operation is initiated. Therefore, upserting identifies two operations (insert and update) which may simultaneous, contemporaneous or near real-time to each other.

Figure 1:
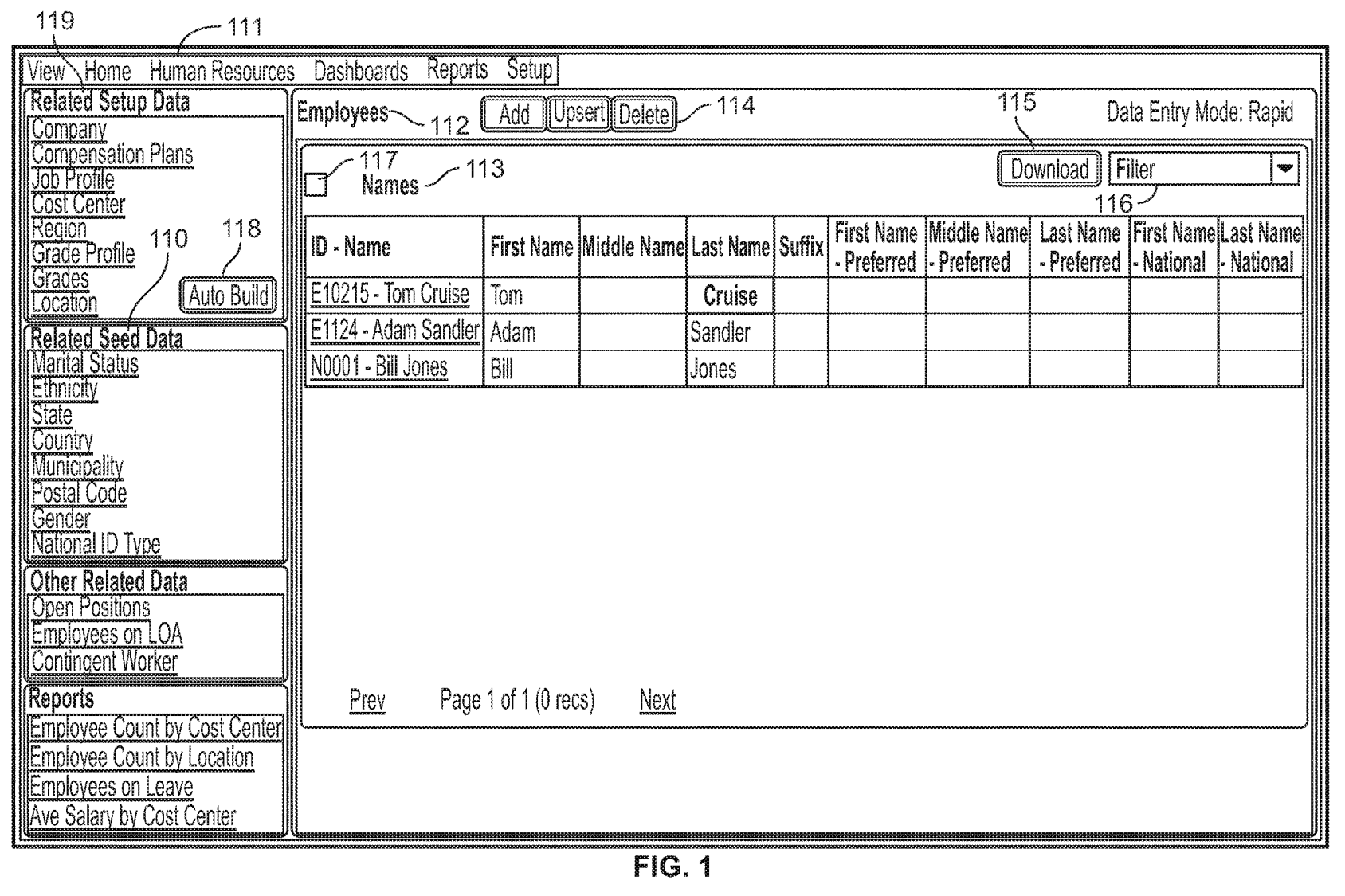

Every object may have an "ID" field and a "Name" field. The ID is unique for a given class and will be used for upserts and delete operations. The "Name" and/or the "ID–Name" will be displayed on the UI as illustrated in FIG. 1. Each class will have an attribute that controls how the data is displayed (Name or ID+Name). Every object has an ID, the users can either select an identifier (ID) or have the application automatically select an ID during manual data entry or during an upsert operation. If the user populates the ID field with a save operation, the application will use that ID. If it is blank, the system will auto-generate an ID. Each class will contain the next object ID and sequence generator mask. The mask will determine the format of the object ID (N+000001). Relationships between objects are matched up by object name. Fields on an object can be tagged, which will be tested during validation of the data (i.e., EmplId, National ID). Object fields are divided into groups (Field Groups) with no more than 10 fields to a group. Fields can be on more than one group. A download will be based on the filter and the field group. The options "Add", "Upsert", and "Delete" (see 114 of FIG. 1) will be based on all fields on a given object as all fields on the employee object may be upserted in one load. Column headings on the EXCEL spreadsheet and .csv file types will map to field names on the object.

An object or data object may represent a large amount of data with multiple field groups and multiple data fields or data elements as part of each field group. For example, the data object "Employees" may be an important enterprise data element behind which is all of the information for each of the employees from projects, organization, human resource information, title, salary, benefits, experience, credentials, etc. Each sub-menu or item behind the employee data object represent a field group, such as addresses, phone numbers, etc. The field groups may have multiple data fields, such as phone number 1, phone number 2, office phone, home phone, cell phone, emergency contact phone, etc.

Example actions may include the field groups, the related setup items, the related seed items, major "batch" functions including "auto build", which creates the ID and names of related child objects to the object running the auto build function and "validate relationships", which validates if data is in a lookup table and sets an item to a color red if there is not a lookup option otherwise the value may be formatted as a link and as "validate data", which validates required fields and other data validations.

Classes are the definition of an object, similar to a table in a relational database. Objects are instances of classes, similar to rows in table in a relational database. Example objects may be "setup" and "seed". The setup data is data to be loaded by the user. The seed data is data that already exists within the tool. The "relationships" illustrate the relationship between classes, such as between a parent class and field and a child class. Relationships will help related item navigations and lookup edits for users. For example, when a user double-clicks on the location name and clicks a "drop down" option, the application will use the relationship definition to map the location class to produce a drop-down list of values. The relationship will also be used to validate the lookup field data type. For example, when "Austin, Tex." is displayed, the application will use the relationship to determine if the value exists in the child object instance (location) and will format the data accordingly. The application will display red if no relationship exists and create a link if the relationship does exist. Fields represent data elements on attributes of a class. Field groups are groups of fields, used to determine how data is navigated on the object page. The application will support the following 4 types of data, such as "text", "number", "date" and "lookup". Lookup data types are defined by the existence of a relationship and may be based on a pointer or link to another information source.

FIG. 1 illustrates an example object layout and selection user interface according to example embodiments of the present application. Referring to FIG. 1, a selective overview of the application controls and dialogs of the object page is displayed. The menu items 111 help with top level navigation and any of the object pages may be accessed from this menu. An object name 112 designates the particular object being accessed. A field group name 113 designates the particular field group of the object being accessed. Field groups may be accessed or changed by using a "Mega Tab." Certain object functions 114 "Add", "Upsert", "Delete" may be used to modify the object that is currently active. For example, a user must be operating on one of the employee field group pages to upsert employees. A user can upsert any or all employee fields on any employee field group page. Other features of the user interface of FIG. 1 provide field group functions such as "download" 115. The download option is controlled by the displayed field group and filter. A user may only download data columns on the field group and the rows in the filter when a template is created with or without example data. The filter function 116 filters the rows of data available in the data set. The filter may be based on free-form text and allow any type of basic filter criteria. The dropdown menu may save the last 10 entries a user has typed in for a specific object. The mega tab 117 enables a large number of tabs to be brought to the forefront of the user display, which provides various field groups on an object. To display the "Mega Tab", a user would scroll a cursor over the object icon, to enable the various options of the "megatab" to appear.

An "Auto Build" option 118 permits automatic resolution of relationships between parent and child objects by creating ID and name entries in child object tables for data that exists in the parent object but does not currently exist in the child object. The functionality is provided by the relationship object which defines fields so the parent objects are "lookup" fields to the child object. The pagelet 119 lists all the setup objects related to the selected object. If the object is a parent object, it is tagged with a "P" and is not included in the auto-build function. Clicking on an object link opens the object page. The related seed data 110 is a pagelet list of all the seed objects related to the selected object.

FIG. 2 illustrates an example megatab display user interface according to example embodiments of the present application. Referring to FIG. 2, the megatab 210 provides a number of different menu options that may appear when the megatab button is selected. Various different data sources may appear so the employee related data can be observed, selected, imported into a workbook, modified, etc. Examples include employee name, time ID's, bonus, national identifier, Orgs, stock, personal data, compensation, home address, military service, job profiles, work address, dates, allowance, phone, manager, commission, email, custom options 1-3, etc.

Figure 3:
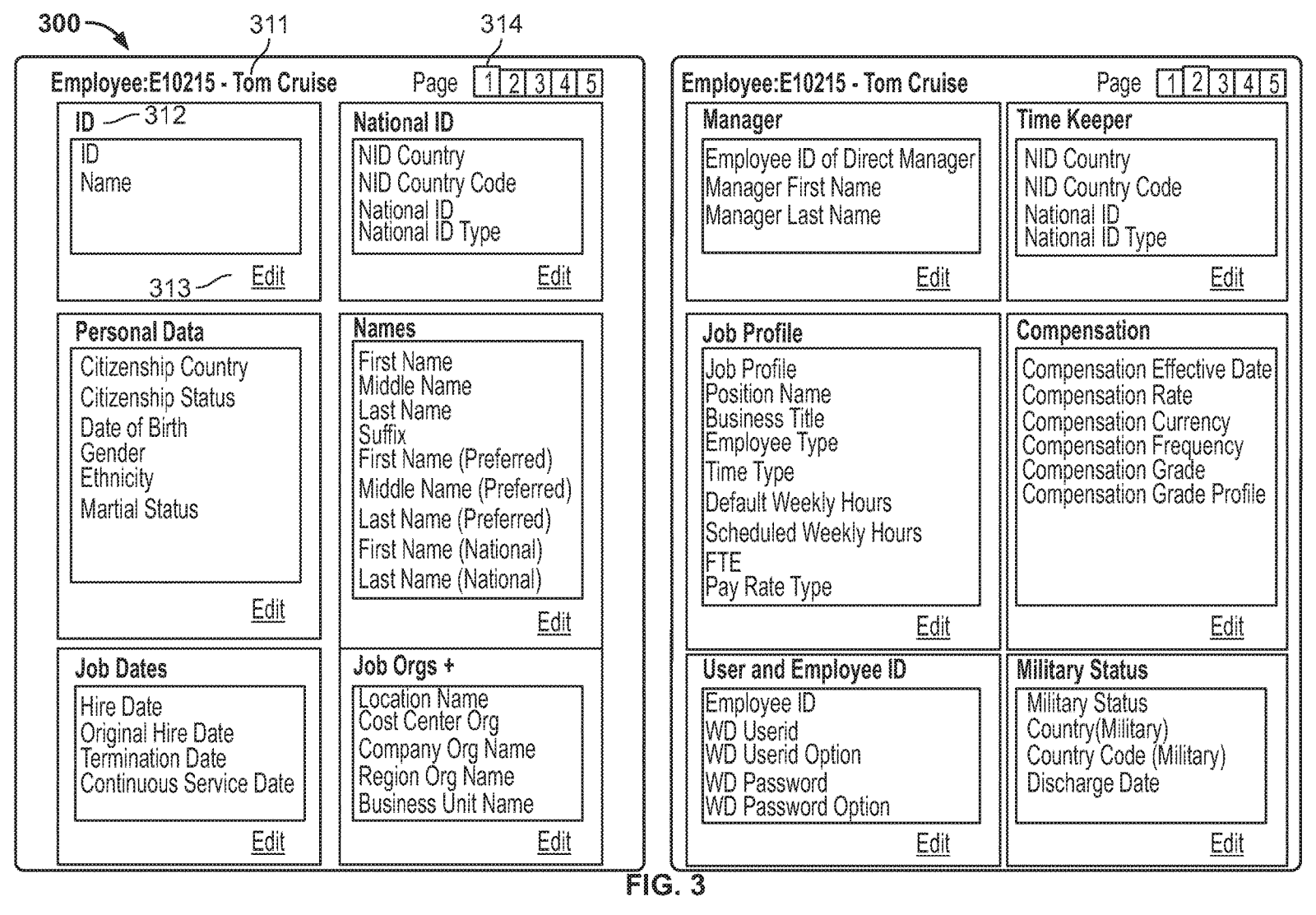

FIG. 3 illustrates an example object link and detailed page user interface according to example embodiments of the present application. Referring to FIG. 3, the object detail user interface includes two side-by-side menus, the first is page one and the other is page two. Selecting an object link opens the object page. Within the object detail page 300 selecting the object link of an object instance or the "add" button of the object class initiates the object detail page. Two "tabs" of the page are shown side by side in FIG. 3. The first item 311 is an object class and the second item is the field group 312 such as ID, or Personal data, etc. The next item is the edit option to edit 313 any part of the field group data. The last item is the page number 314 of the list of field groups. There are various pages of field groups that may be used to view the information.

Figure 4:
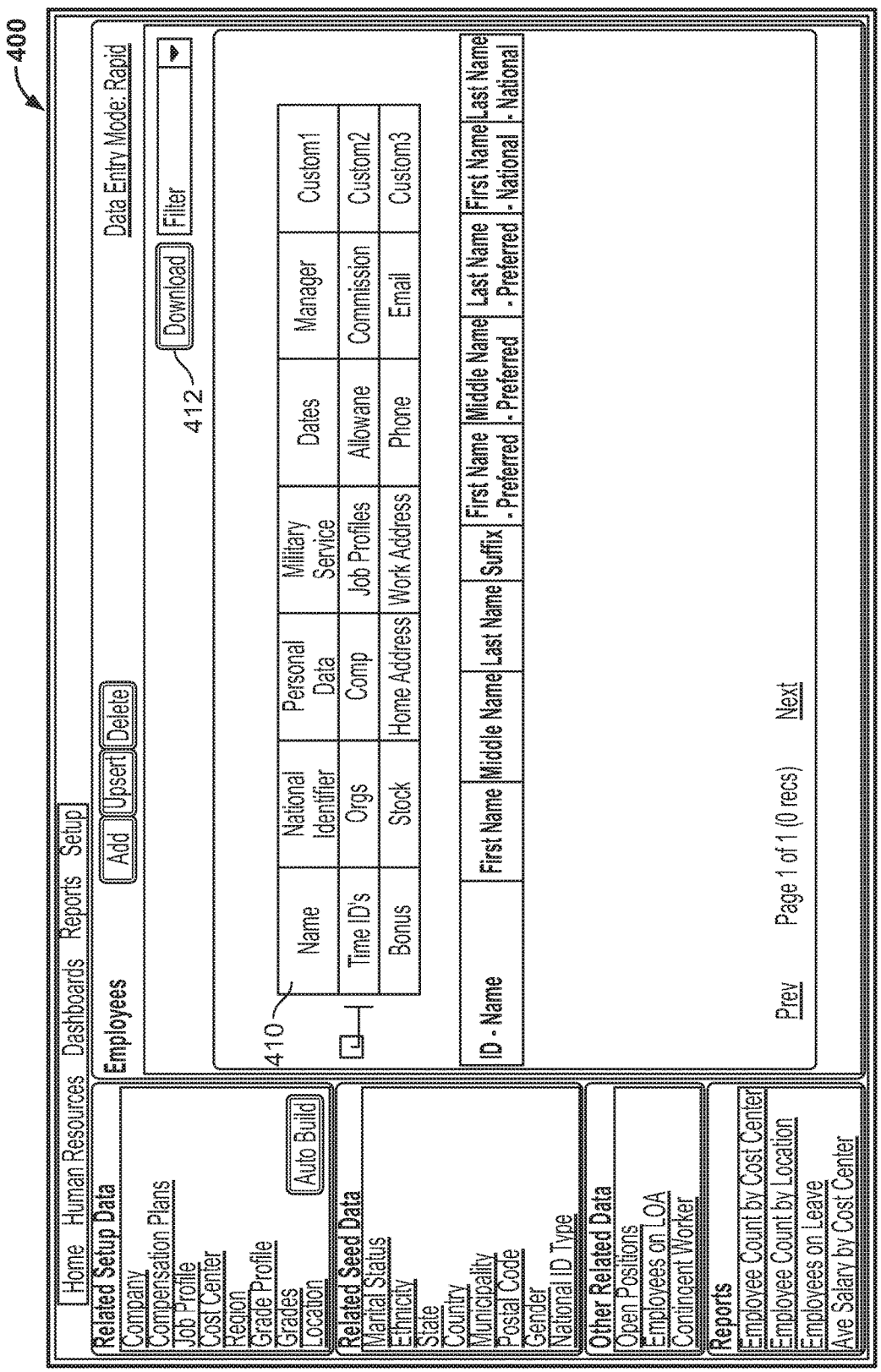
FIG. 4 illustrates an example initial data load selection user interface according to example embodiments of the present application.
Figure 5:
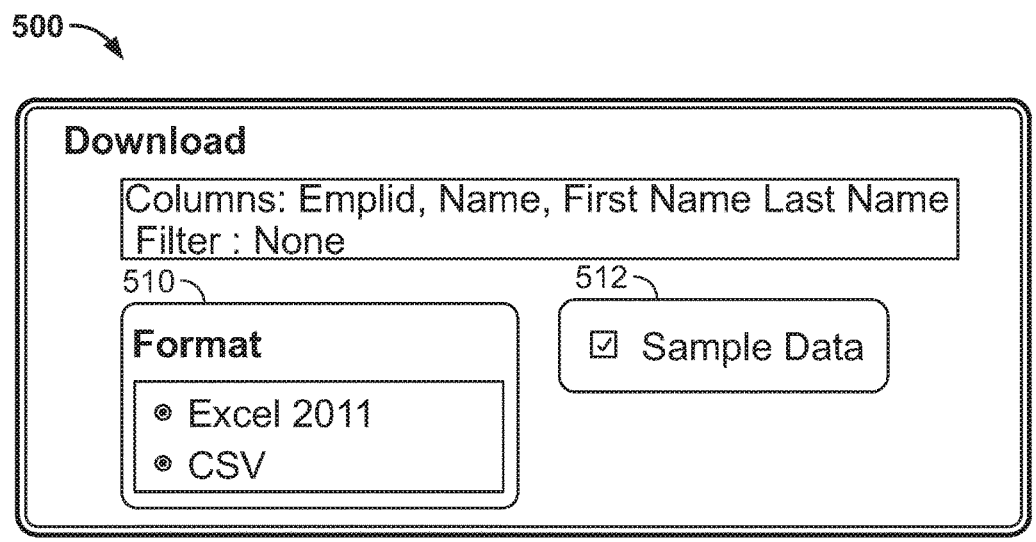
FIG. 5 illustrates an example data download option user interface according to example embodiments of the present application.

According to one example use case, an initial load of data may provide configuration of the field groups. FIG. 4 illustrates an example initial data load selection user interface according to example embodiments of the present application. Referring to FIG. 4, the user interface 400 may include a way to configure field groups by selecting a field group 410 and then selecting a download option 412. Next, a user may select another menu 500 to include a "Format" 510 as illustrated in FIG. 5 for a data upsert operation and a "Sample Data" option 512 as a data type. The various field groups may be specified to be downloaded. This operation will create an EXCEL spreadsheet or .csv file with the appropriate columns and sample data.

Figure 6:
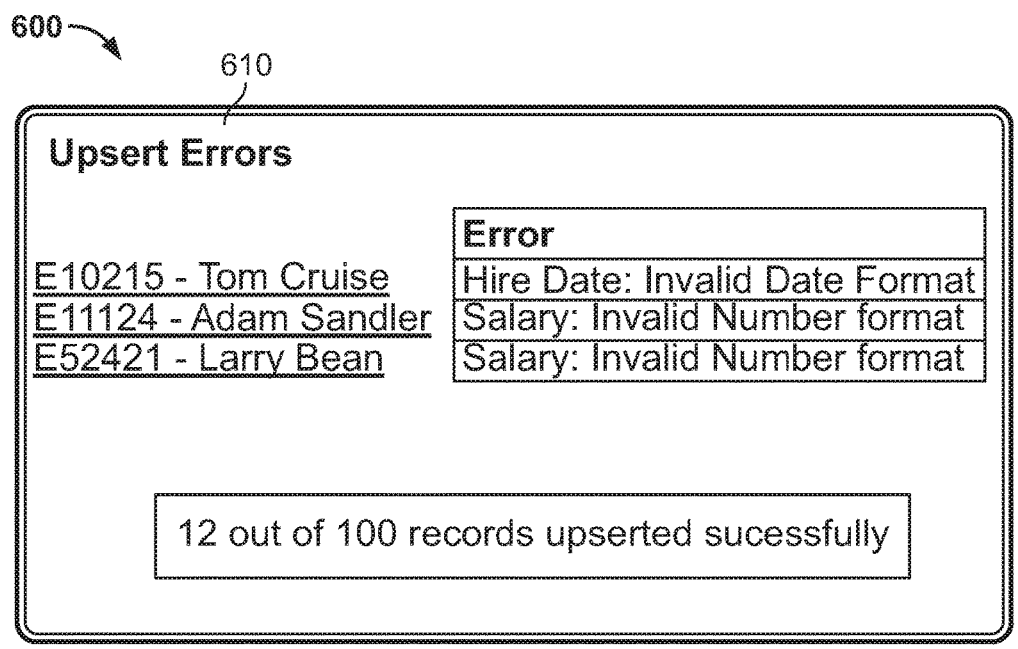
FIG. 6 illustrates an example error upsert user interface according to example embodiments of the present application.

The application may then obtain legacy data and have it provided into the template. If the user does not have an ID the application will create one automatically that can be used for subsequent upserts or delete operations. Column names map to field names on the object. Field names may be uploaded as needed. Next, an upsert operation may be performed to have the data upserted accordingly. Data will now appear as part of the application system. FIG. 6 illustrates an example interface 600 of the compiled errors 610 that may occur after an upsert attempt, such as an invalid record number format. The errors may prompt a change to occur so the record can be upserted again correctly.

Figure 8:
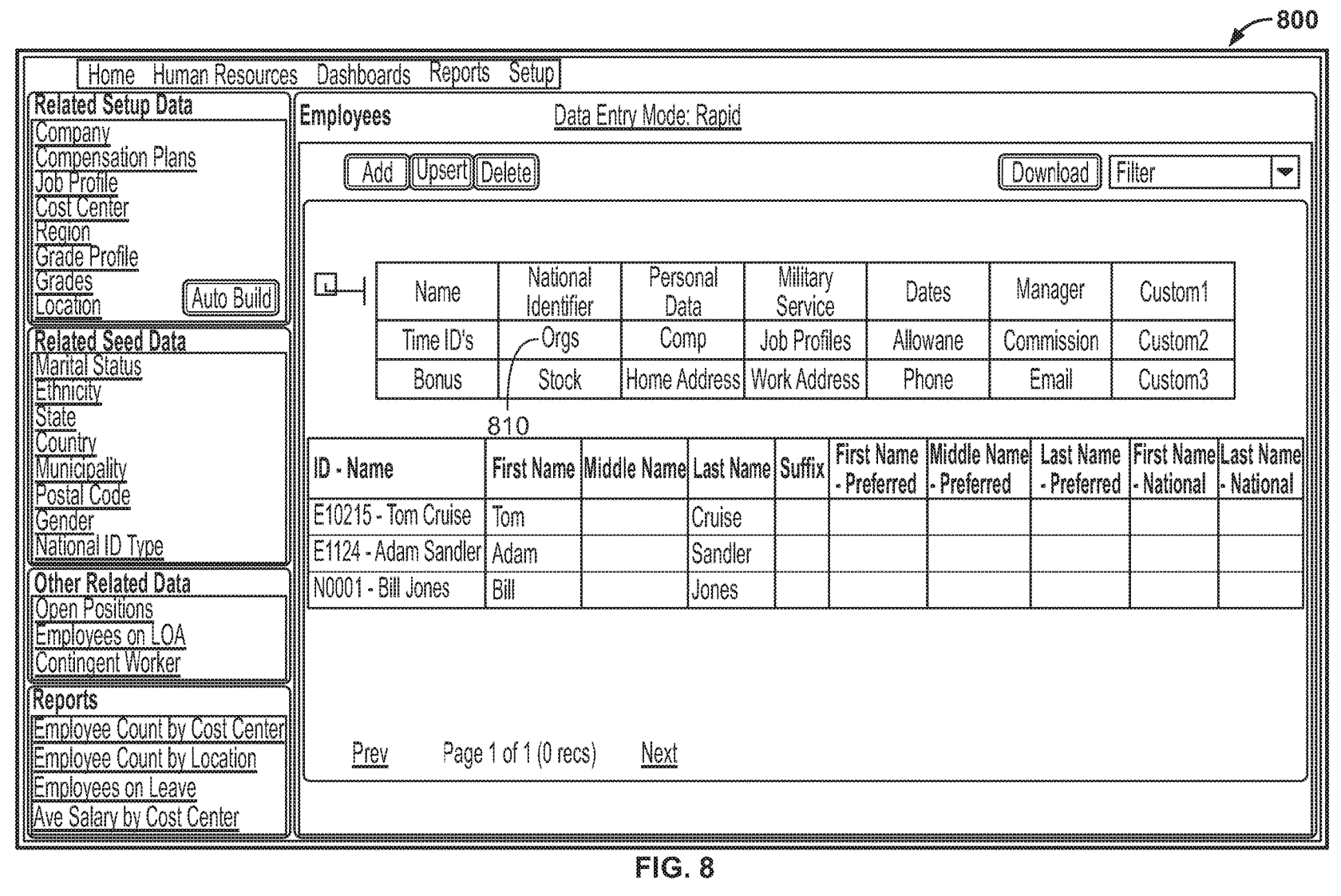
Figure 9:
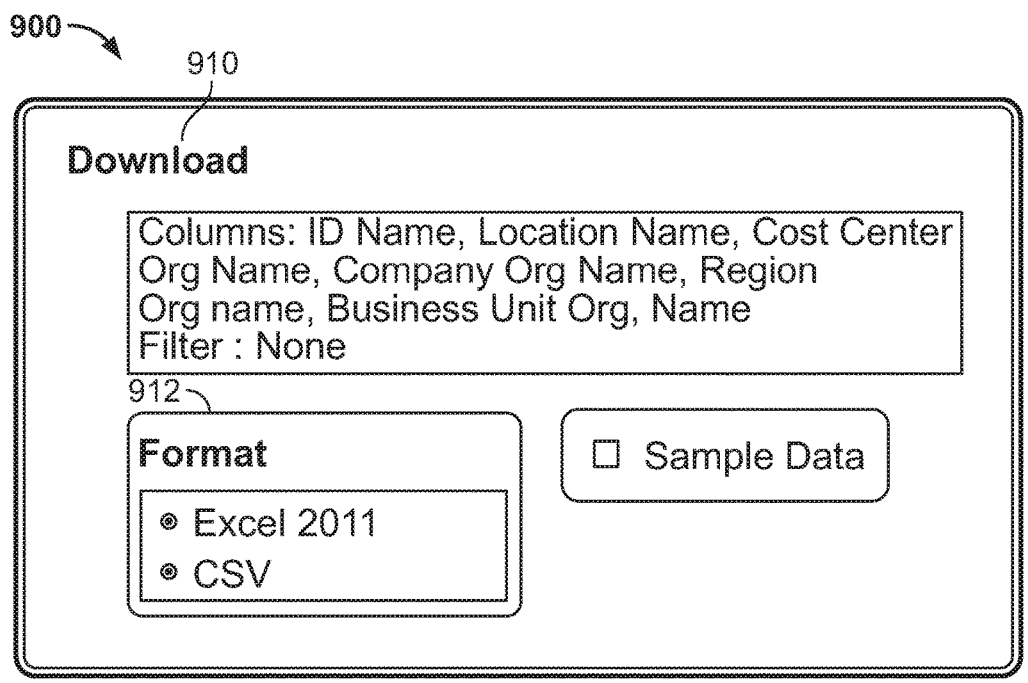
FIG. 9 illustrates an example subsequent data upsert user interface used to upsert additional data entries according to example embodiments of the present application.

Data may be upserted item by item. First, "names" 710 may be uploaded as illustrated in the user interface 700 of FIG. 7 and "Job Orgs" 810 may be uploaded from the mega tab menu option of user interface 800 of FIG. 8 by selecting the item 810 and selecting "download" 910 and "format" 912 with no data as identified in menu 900 of FIG. 9. The spreadsheet created at download may now be opened and populated with data 1010 from the legacy system as illustrated in the user interface 1000 of FIG. 10. Certain data items may appear in red since those fields are lookup data types that have no matching value based on the relationship. For example, the "Location Name" field may have been populated on the 'Employee' object but there is no corresponding location object that matches. The results of the upload 1110 may appear in the application as illustrated in the user interface 1100 of FIG. 11.

In another example use case, data relationships may be setup among the various objects that have been loaded. Both a parent object and a child object may be manually entered, upserted, and/or autoloaded then upserted. One way to quickly load data and address related child items is to load the employee level data first, and then create the ID and Name on all child objects automatically using the auto-build feature. This will create a data configuration in the application and resolve all relationship errors and update the field to show a valid link to the object. A user may select a location on the related setup items pagelet or use the human resources menu to navigate to the location object. Here the user can repeat the process of downloading and upserting and/or performing manual entries of data. The letter "P" may be set after the identifier "Employee" indicates it is a parent object and may not be eligible for an auto-build. In the case where there are no related setup items eligible for the auto-build, the "Auto build" button is hidden or grayed out.

Figure 12:
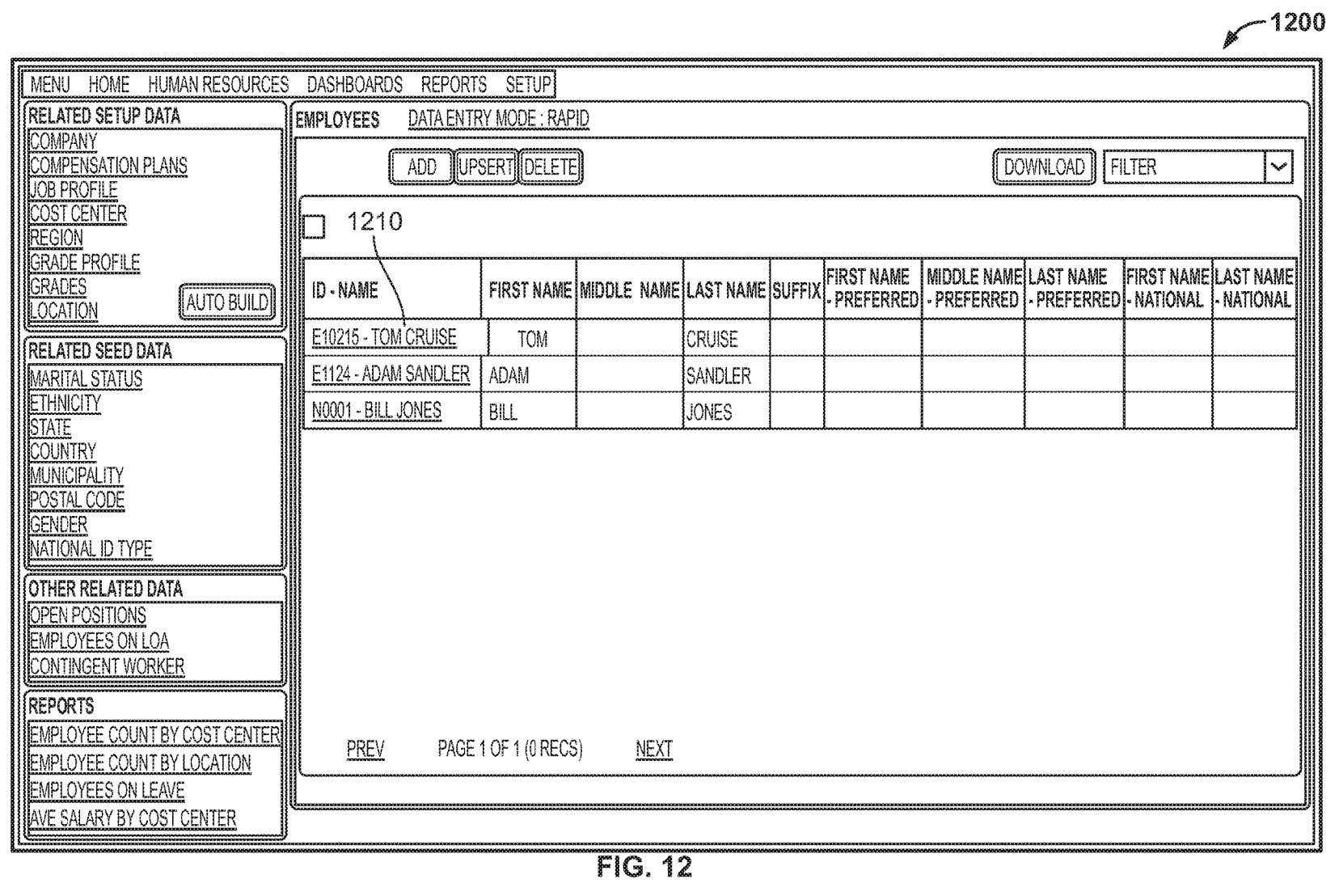

There are two ways to resolve seed data relationships. One way is to manually enter or upsert the seed data name fields on the parent object. FIG. 12 illustrates an example user interface 1200 where an object ID is selected 1210 to reveal an object detail page(s) for that object by displaying all the fields organized by field group for that given object.

Figure 14:
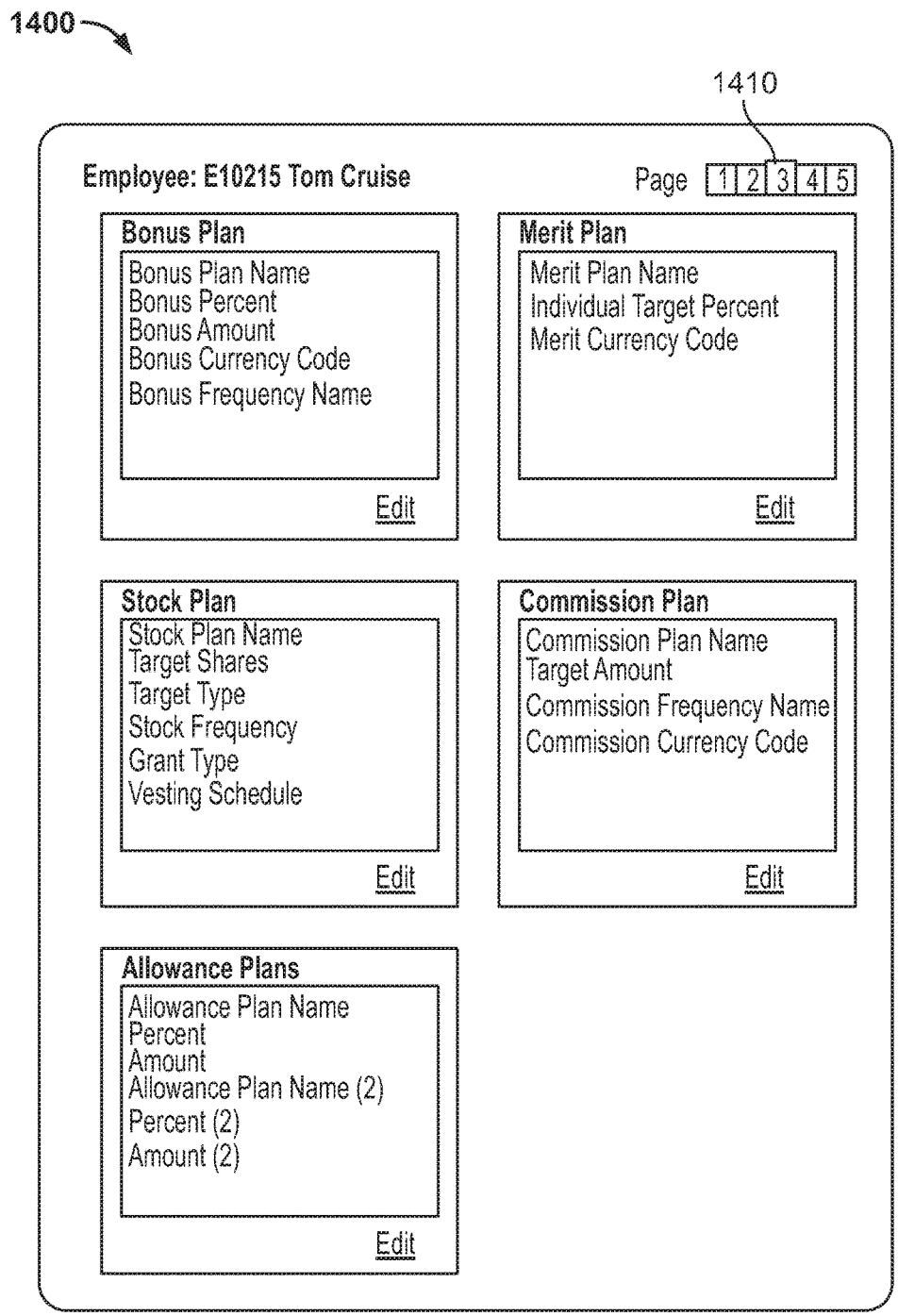
FIG. 14 illustrates another example employee object field group interface according to example embodiments of the present application.

FIGS. 13-15 illustrate various object detail page menus. Selecting the page numbers 1310 permits a user to tab through the data. FIG. 13 illustrates user interface 1300 which includes pages 1 and 2 side-by-side. Selecting the edit link in each paygroup creates a modal pop-up, which permits a user to edit the data in that field group. In order to add and/or editing data, each object has two modes of adding and editing data. The first mode is a rapid data entry mode and the second is a data wizard mode which provides step-by-step instructions for the user to modify one field group at a time to add or change items. Each page will have detailed instructions on what the data is and how to fill populate that data. This mode will be the default for objects with small amounts of unfamiliar data (i.e., compensation plans, grades, etc.). Both modes will be inherently available for any object. FIGS. 14 and 15 illustrate additional field groups for pages 3-5. The user interface 1400 of FIG. 14 illustrates "page 3" 1410 having all different field groups from other pages. FIG. 15 provides a user interface 1500 with additional field groups for pages 4 and 5 illustrated as items 1510 and 1520. The user may scroll back and forth to view all the field groups and make changes to the content accordingly.

According to one example embodiment of the user interface 1600 of FIG. 16, in rapid data entry mode, a user can double-click on any field 1610 and change it on the field group page. If the field is a related field, a drop down menu may provide a list of values in the setup data to select. However, a user can always type in a value that is not on the drop down list and auto-build it or manually update it at a later time. Selecting the "add" button brings up the object detail page so editing can be performed.

Figure 17:
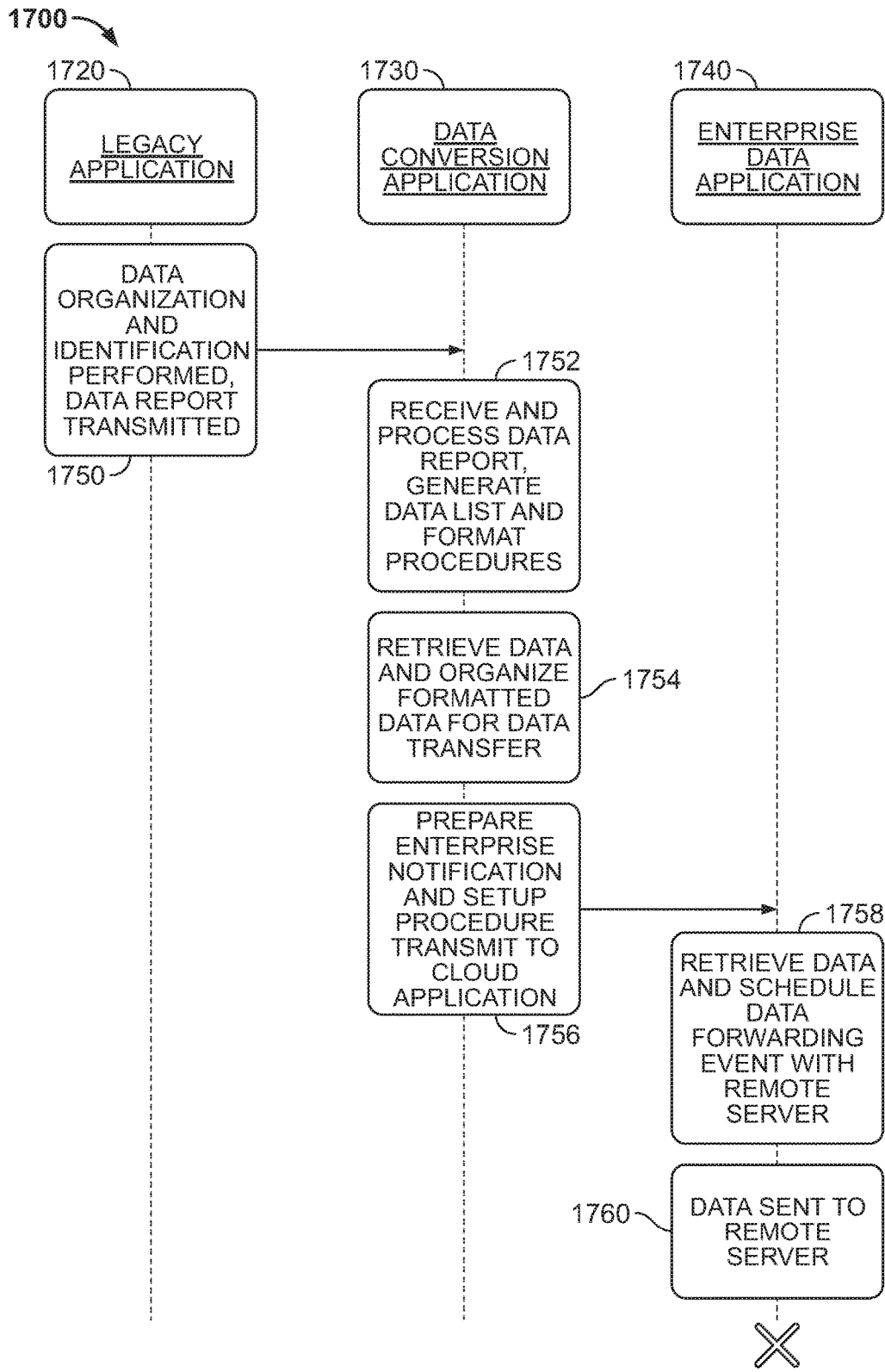
FIG. 17 illustrates an example system diagram communication signaling diagram according to example embodiments of the present application.

FIG. 17 illustrates an example system diagram communication signaling diagram according to example embodiments of the present application. Referring to FIG. 17, the system diagram 1700 provides a legacy application 1720 operating as a data source on a server and a data conversion application 1730 setup to receive data from the legacy application 1720 and process the data prior to transmitting the data to the enterprise data application 1740 which can store, port, and/or retrieve data from larger data storage facilities.

In one example operation, the legacy application 1720 may organize and identify certain data that is a candidate to be transmitted 1750 to a data conversion application 1730. The data conversion application 1730 may receive and process data and generate a list of formatted data 1752 for user review and approval. The conversion application may also retrieve the data and format the data 1754 for exporting to an enterprise application 1740. Simple data sets and spreadsheet formats may be automatically created to expedite data conversion and export efforts 1756 to the enterprise application 1740. The data may be retrieved and scheduled for a data forwarding event to a remote server 1758. The data may then be sent to the remote server 1760 stored in a remote data processing facility (i.e., a cloud server network). The data migration application tools may be setup as APIs and user interface applications through a JavaScript object notation (JSON) language-based application or via other web-enabled and high-level languages, such as XML.

Figure 18:
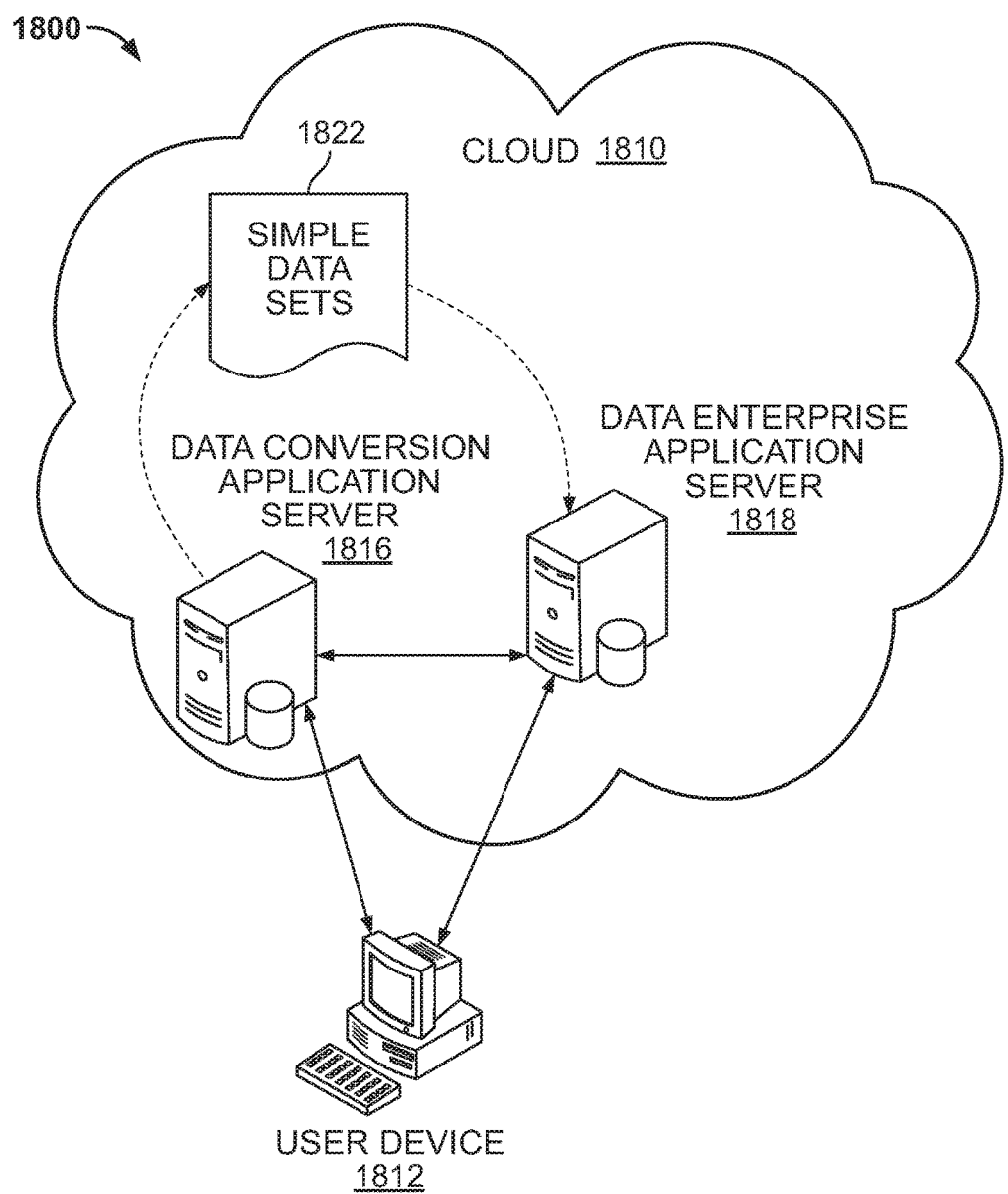
FIG. 18 illustrates an example network configuration according to example embodiments.

FIG. 18 illustrates a network 1800 with the user device 1812, the data conversion application server 1816 and the data enterprise application server 1818. In operation, the user device 1812 may initiate a data conversion process that is handled by a particular application server 1816. The data will ultimately be selected and formatted into a simple data set 1822 that is transmitted to an enterprise application server 1818 which determines where to send the data (i.e., a database facility, a server cloud 1810). The user device used to perform edits and data gathering may be a computer, laptop, mobile, wireless or cellular phone, a PDA, a tablet, a client a server or any device that contains a processor and/or memory, whether that processor or memory performs a function related to an embodiment of the application.

Figure 19:
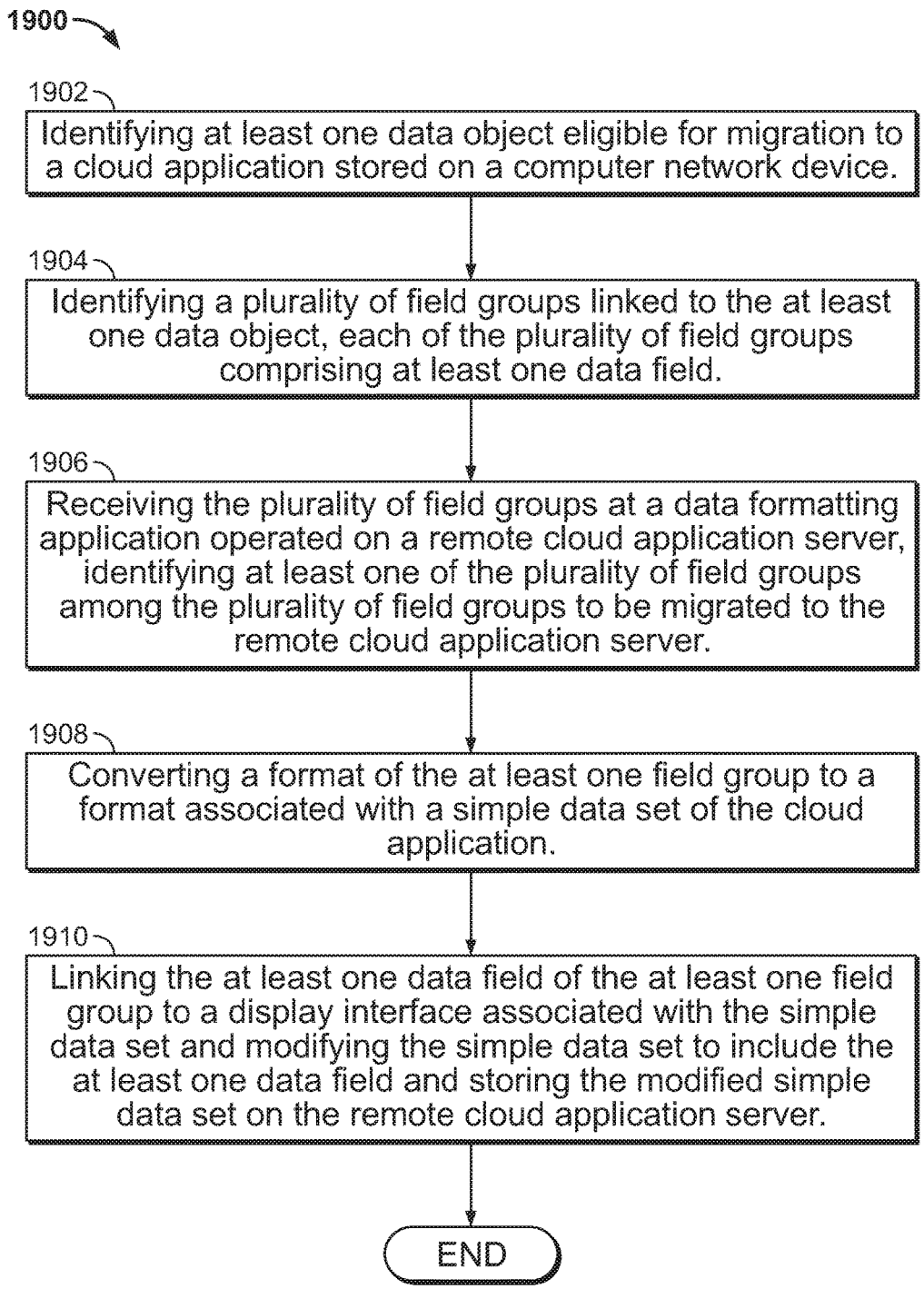
FIG. 19 illustrates a flow diagram of an example method according to an example embodiment of the present application.

FIG. 19 illustrates an example method of operation according to example embodiments. Referring to FIG. 19, the flow diagram 1900 may include identifying at least one data object eligible for migration to a cloud application stored on a computer network device at operation 1902. The method may also include identifying a number of field groups linked to the at least one data object, with each of the field groups including at least one data field at operation 1904. During the identification operation, a simple data object model (e.g., HR, benefits, payroll, etc.) may be based on a number of simplified objects which include a number of field groups and, in turn, a number of data fields. The object model is based on a proprietary data set format used by a product, such as WORKDAY which utilizes large data files and corresponding formatting often referred to as ILOADS. The object model is customized to customer preferences and is designed based on information obtained from the inefficiencies of conventional data gathering applications with the goal of optimizing those conventional data gathering functions. Although customers are still required to transform their data from their legacy system applications into the simple data object model of the present application, the entire procedure is still increasingly optimal over the conventional data gathering applications.

The method of FIG. 19 may also include receiving the field groups at a data formatting application operated on a remote cloud application server and identifying at least one of the plurality of field groups among the field groups to be migrated to the remote cloud application server at operation 1906. The method may also include converting a format of the field group to a format associated with a simple data set of the cloud application at operation 1908, and linking the one or more data fields of the at least one field group to a display interface associated with the simple data set and modifying the simple data set to include the at least one data field, and storing the modified simple data set on the remote cloud application server, at operation 1910.

Figure 20:
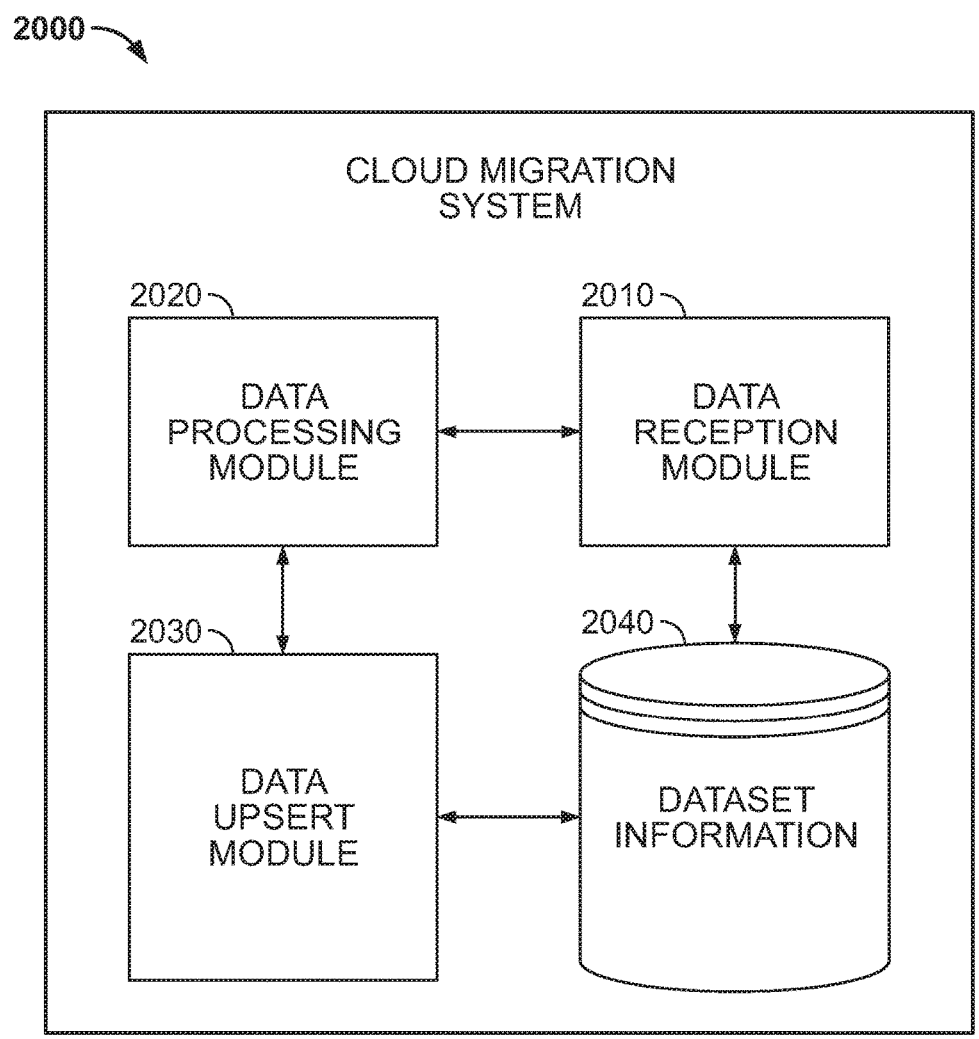
FIG. 20 illustrates a system configuration that is configured to perform one or more operations corresponding to the example embodiments.

FIG. 20 illustrates an example system configuration 2000 configured to perform one or more example methods of operation. Referring to FIG. 20, the system may include a data reception module 2010 which receives and identifies at least one data object eligible for migration to a cloud application stored on a computer network device. The data processing module 2020 may then identify a number of field groups linked to the at least one data object, each of the field groups includes at least one data field. The field groups may represent large numbers of data entries for a particular data record of a spreadsheet or database file or multiple files. The link between a field group in the migration application and the actual raw data may be complex and include multiple pointers, links and associations between a single field group and the actual data elements or data fields of the various data files providing such information. The reception module 2010 may also receive the field groups via a data formatting application operated and identify at least one of the field groups among the field groups to be migrated to the remote cloud application server. The format of the field group may be migrated to a format associated with a simple data set of the cloud application, linked to a display interface associated with the simple data set. The data upsert module 2030 may modify the simple data set to include the data field, and store the modified simple data set in a dataset information database 2040.

The links and pointers between a field group and the actual raw data stored in the corresponding data file(s) may include a one to many ratio where the field group represents a particular column or row of data as a destination for multiple data fields from multiple different documents. For example, the field group may be identified by a destination pointer, such as 'FG1' and the data fields may be from various different data files and columns and rows of data, such as 'filename "ABC"', 'DF1', 'filename "ABD"', 'DF2', etc. In this case if the FG1 is the destination for the data in the data fields of different files then one pointer may have multiple links to other objects or pointers in order to retrieve and populate the field group for the corresponding simple data set result from the conversion procedure. The simple data set may also be referred to as a simple data object (SDO) which is what results from a conversion process, and the field groups are a way of grouping the fields on the object, The data structure of the SDO is based on the process for converting that format into the more complex original ILOAD format.

The application may apply a fixed number of data fields of the field group to the at least one simple data set. A field group may have multiple instances of data fields which represent a column or row or multiples thereof in a database/spreadsheet file. The fixed number of data fields of the field group that are applied to the simple data set may be fewer in number than an original number of data fields of the field group. The field group identifies at least one data column in a database file and/or a spreadsheet file. The field group may instead be based on a number of data columns from a plurality of different corresponding database files or spreadsheet files.

The processing module 2010 may perform converting a format of the field group to a format associated with a simple data set of the cloud application by identifying a total number of available data columns in the data formatting application, and reducing a number of actual data columns to a lesser number of actual data columns prior to converting the format of the field group via the data formatting application. Lastly, the data may be formatted and upserted to the application. The fields associated with the upserting operation may be updated automatically via a key field of the data formatting application which is a designated field in the formatting application that receives updates automatically as new data is inserted into at least that particular key field thereby automating the upsert function.

The data object model of the simple data set is designed to be a template or data model for the client to adapt the migration data to be moved to the cloud. The data object model or the corresponding simple data set format may be customized to the particular data migration used by the client to migrate data to the cloud. The simple data set, SDO or object model may be identified as metadata or a data structure which is designed to receive data and to be populated with data, but in of itself the data object can be a format that can be used to convert raw data (e.g., field groups, data fields, etc.) to a finalized simple data set that is ready for migration.

The plurality of data records being formatted into a corresponding plurality of simple data sets may include identifying a total number of data columns available in the data formatting application and reducing the number of available data columns to a lower number of data columns used to format the data in the data formatting application. For example, 40 potential data columns in a spreadsheet may be reformatted into 15 in the simple data set. The plurality of data records may be upserted at any time by receiving updated data in a key field of the data formatting application after the plurality of data records have been received. The key field is a designated field that may receive updates automatically from the computer network device as new data is inserted into at least one existing field associated with at least one of the plurality of records.

FIG. 21 illustrates a graphical user interface display of field groups and corresponding simple data set data corresponding to the example embodiments. Referring to FIG. 21, the user interface 2100 includes a display banner 2110 that offers the user options, such as home, dashboard, reports, core HR, etc. The user may begin a migration from a legacy data organization application to the cloud by utilizing a select object 2112 or field group. The main topics or field groups may represent many database fields and/or spreadsheet columns which can be retrieved on the fly or preconfigured in a memory location to be available when needed. In this example, the field group 'employees' 2114 is being selected for data migration and integration efforts related to that field group and its corresponding sub-category simple data sets.

Figure 22:
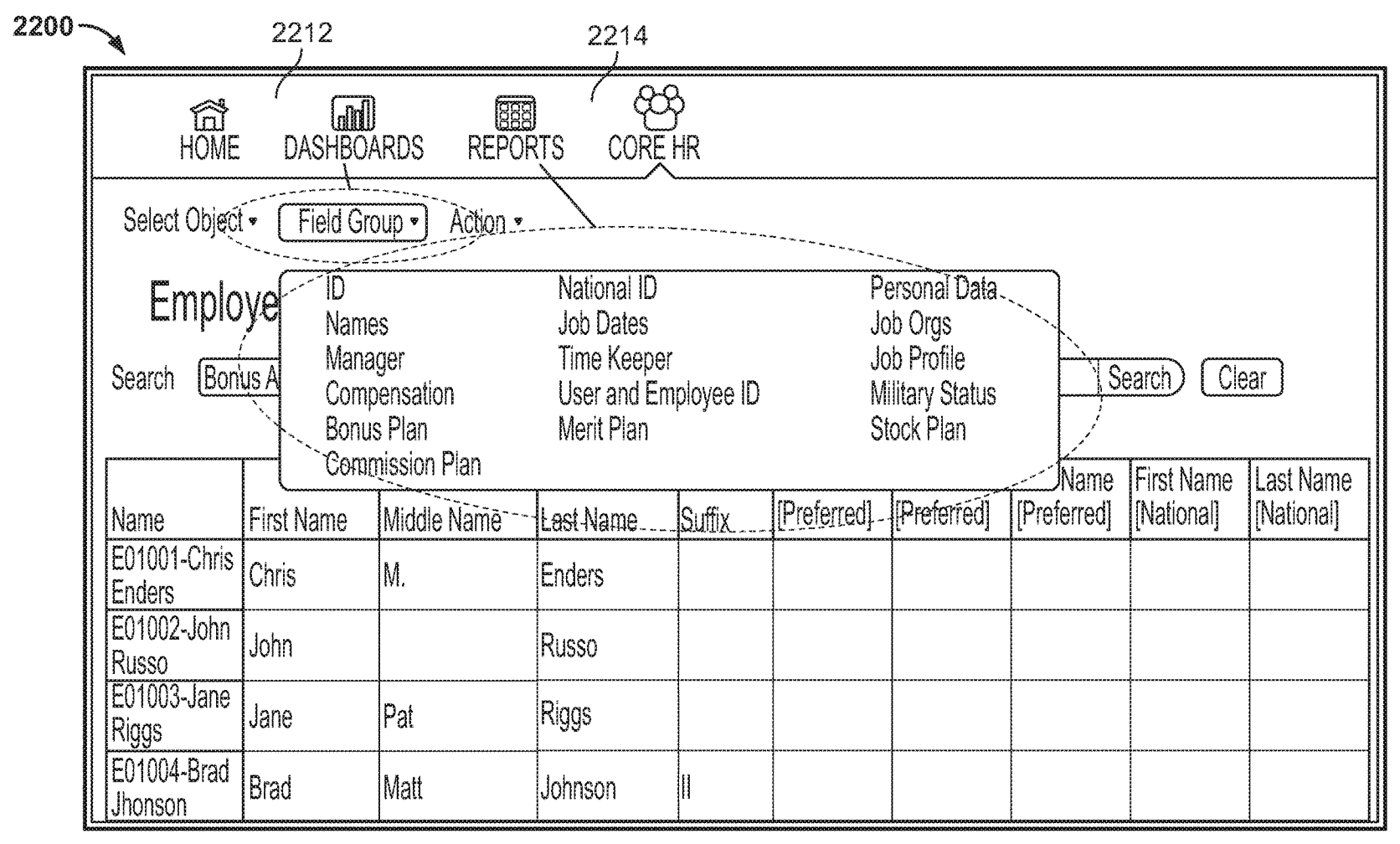

FIG. 22 illustrates another graphical user interface display of field groups and corresponding simple data set data corresponding to the example embodiments. Referring to FIG. 22, the user interface 2200 includes a particular field group 'employee" 2212 and a list of various different simple data sets 2214 which invokes a 'mega tab' or multiple option menu for selecting data fields which are linked to the selected field group. Each option in the mega tab may be a column or entry list in one or more spreadsheet, database, etc., type documents. There may be multiple columns or arrays of data which are linked to the field elements of the simple data sets, such as ID, names, Manager, etc., all of which are part of an employee's data record.

Figure 23:
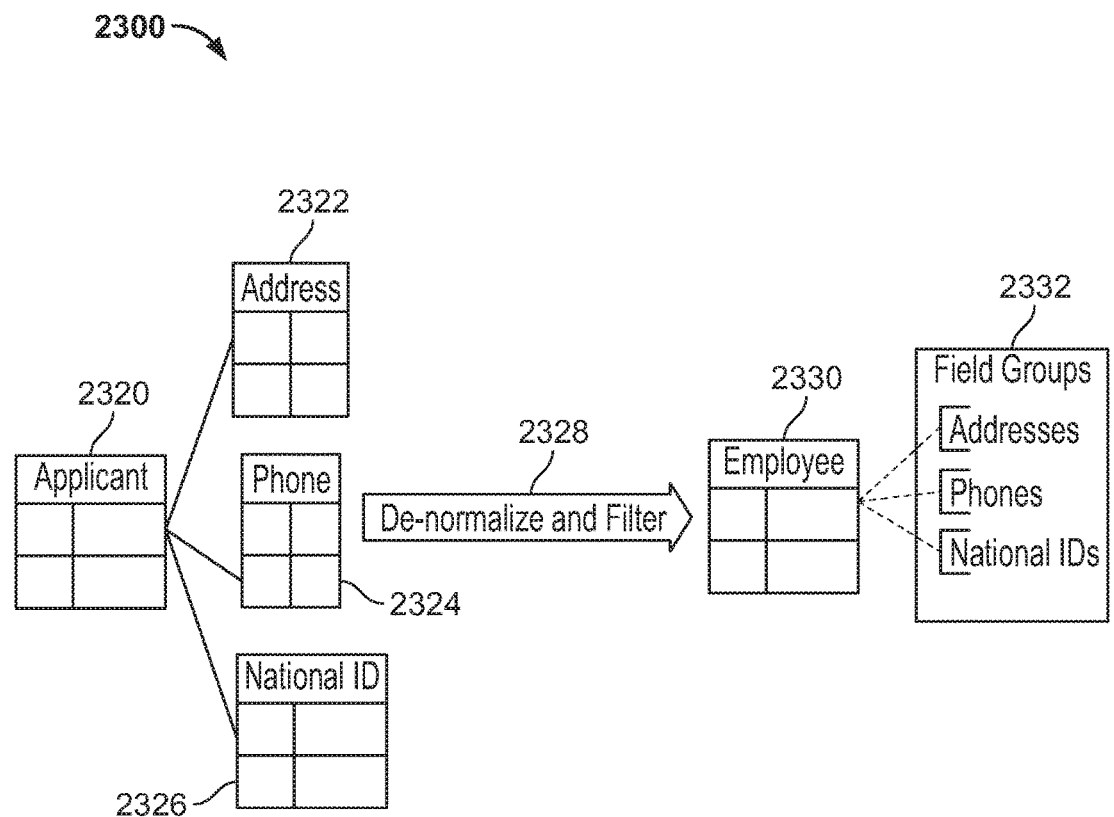
FIG. 23 illustrates a logic diagram of simple data sets being formatted and processed to become simple data sets corresponding to field groups according to the example embodiments.

FIG. 23 illustrates a logic diagram 2300 of simple data sets being formatted and processed to become simple data sets corresponding to field groups according to the example embodiments. Referring to FIG. 23, the data elements may include address 2322, applicant 2320, phone number 2324, and national ID 2326. The simple data sets include the detailed information related to the particular field group of interest. The formats for loading data can be complex and difficult to understand and implement by most users. The simple data sets permit clients to gather the necessary data in a simple format, which will then be converted into a complex form required for loading into cloud storage application. The data retrieved may be from multiple different documents, data columns, etc. stored across the enterprise data repository. The data may be retrieved and de-normalized and/or filtered 2328 so the employee record 2330 that is pre-populated for data migration may include a plurality of tags, pointers, records and indicators to various different fields and columns prior to the data field group 2332 organization and migration to the cloud. The data required for cloud migration may be striped across hundreds of data files, but the data integration tool extracts the data so it can be upserted in a timely and simple manner to update the field groups 2332.

The field groups may include data objects (i.e., 'Employee') that have upwards of 80 fields that potentially need to be loaded with data sets related to each field. Field groups organize and link those data fields into logical manageable groups that help the user focus on loading one field group at a time. In operation, complex data structures are de-normalized and the user is limited to a fixed number of elements (i.e., 3 phone numbers). Any system data may be filtered (i.e., reference IDs). The simple data set employee is predefined and broken down into field groups and the field groups breaks the data into workable data segments and also provides the structure to enter the data using a "Wizard". Upserting data and the use of spreadsheet applications, such as EXCEL® provide a way to download data from the data migration application into EXCEL, manipulate it, then upsert the data back into the migration application.

As for data entry modes of operation, there may be a rapid data entry option and a Wizard application tool to enter data. The tool may permit two standard modes of entry, rapid data entry in which the user can enter data in a tabular format and the wizard mode, where a process will guide the user through data entry. The type of data and experience level of the user will help determine which mode will be most appropriate. Data format validations may occur during API data loads (i.e., date formats) and must be correct or the data load will fail. Upsert operations permit the users to update or insert data at the same time based on a key field. The process will update records where the key exists and will add new records where the key does not exist. This process provides the ability to download data from the tool as an attachment (.csv or EXCEL format).

Data preparation for loading into the cloud may require that the data be mapped that is already configured for loading. For example, a county may already exist in the tenant field, but we need to designate the 'country code' on an employees work address which will be provided by the client. Data that will be pre-populated in the tool may be denoted as "Seed Data".

A data object should either be seed data or configuration data, but not both types. It may be too complicated to determine on a record-by-record basis the source of an item. For example, a client may load cost centers into the tool then go to the cloud migration tool to update data and then require the tool to extract a cost center from the tenant into the data migration tool. Reference ID's should not be assigned until a predefined load output time. Auto-generation of configuration data and upserting may provide a particular migration implementation. Employee level data may be loaded first, configuration key data is generated based on that data, then configuration data is updated by downloading, adding values, then upserting the data. API's will be used for loading data to the data migration application.

The simple data sets may also be referred to as simple data set objects (SDOs). As part of implementing the application conversion and migration functions of the present application, in one example only a small subset of the data object raw data is actually required from the customer application and the remainder of the data can be derived from other subsequent data seeking operations. It is the SDO (application interface) and the accompanying data transformations that are isolated from the customer to obtain those simple data sets into a migration-ready format.

The application interfaces of the present application are data staging interfaces in which a user can organize the data from a legacy system, review, validate and fix any problems or errors before loading the data into a target system. Separation of data gathering skill sets permits functional users to work on obtaining the data they understand to be correct, while technical users can focus on the system information and complexities of loading the data. A self-service aspect of configuring data may initiate dynamic process "wizards" or automated instruction applications that guide, question, answer and enable users to setup and execute the creation of configuration data.

According to other examples, the deferred referential integrity and deferred edit checks may be an additional function in which data is permitted to be entered or submitted in an unformatted and/or unorganized format with the subsequent operation of having a user modify the data in the application with the help of a validation process to report on issues. Most applications today require data to pass referential integrity and edit checks before it is saved within the system. This feature would allow one to fix data within the interface application instead of using some other data conversion tool. Since the application is accessed or processed in the cloud, it permits for the collaboration of loading, reviewing and fixing data all in one interface application, and also permits for standard conversion programs that can convert specific source legacy system data into simple data set format. For example, if the source system is known (e.g., PEOPLESOFT®, ADP®, etc.) a conversion program can be created that extracts their data into the present data migration application interface, where the data can be reviewed, fixed, augmented, until it passes all centric validations so that it can be loaded into the migration cloud application.

Figure 24:
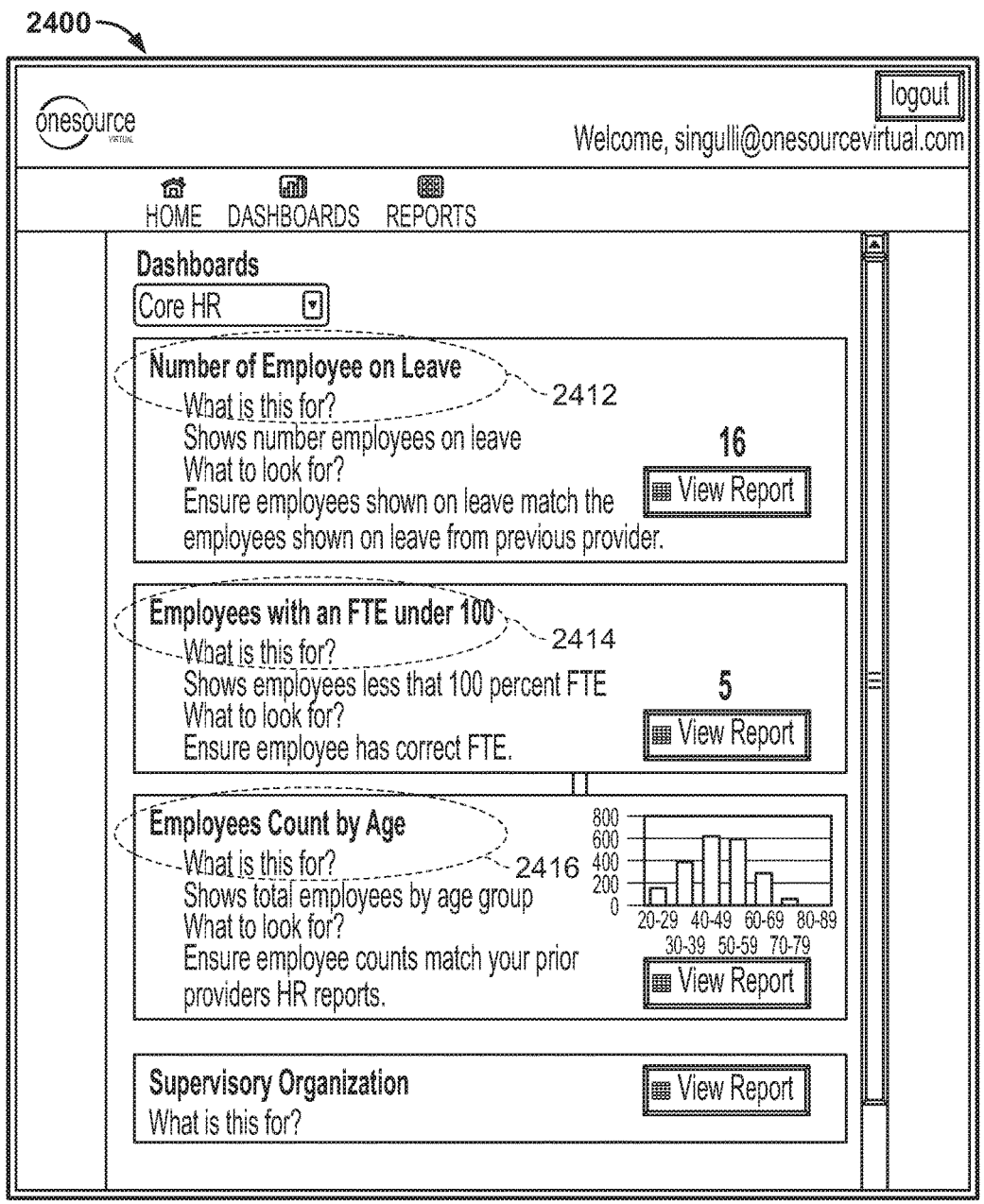
FIG. 24 illustrates a graphical user interface display of simple data set data migration results according to the example embodiments.

FIG. 24 illustrates a graphical user interface display of simple data set data migration results 2400 according to the example embodiments. Referring to FIG. 24, the user interface includes various 'employee' specific summaries that provide summary data of all employee data uploaded. This provides test data to determine whether the employee data is updated correctly. A summary of any data field group may be provided to reflect the recently added results. For example, the total number of employees on leave may be tabulated 2412 along with FTE data 2412 and employee count 2416.

Figure 25:
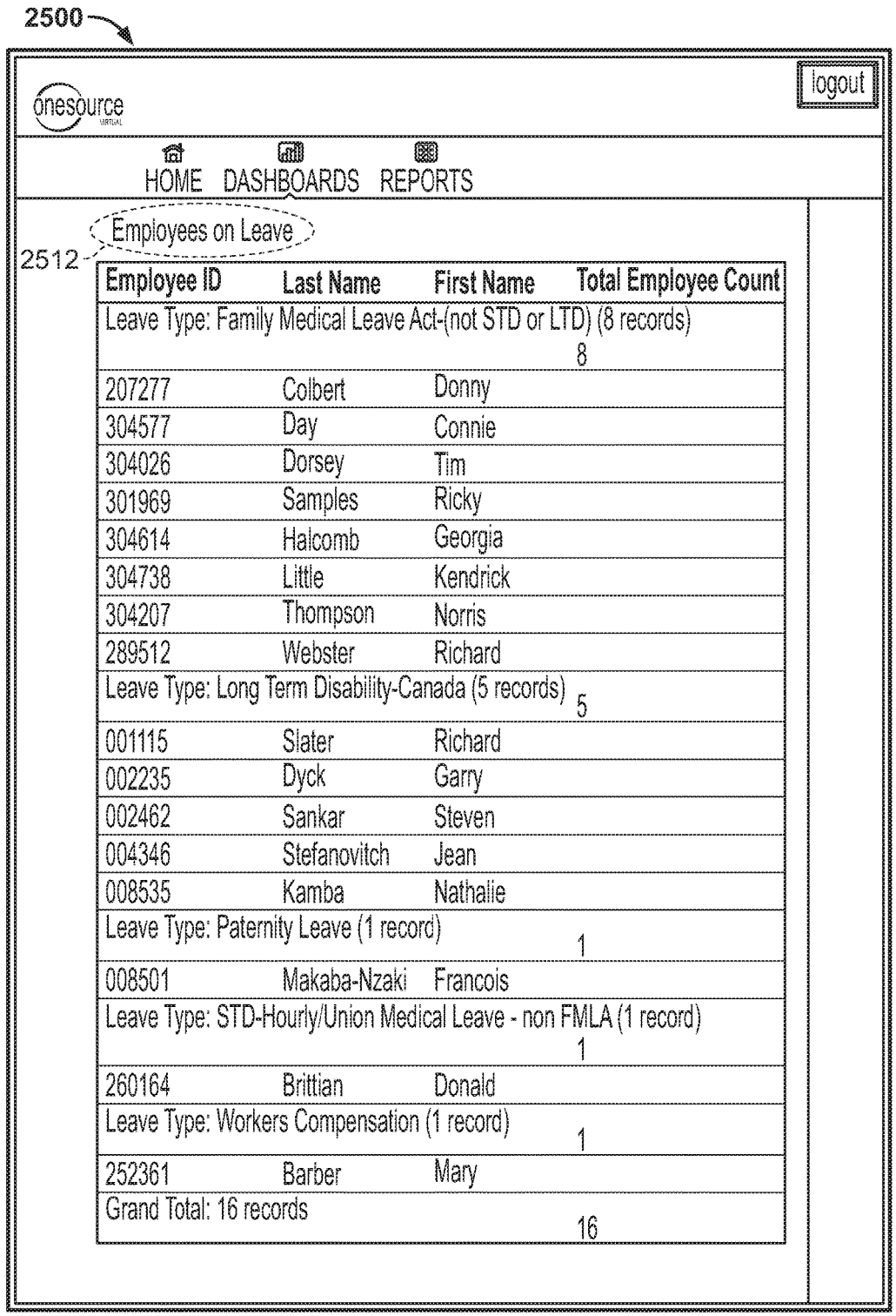
FIG. 25 illustrates a graphical user interface display of simple data set data corresponding to the example embodiments.

FIG. 25 illustrates a graphical user interface display 2500 of simple data set data corresponding to the example embodiments. Referring to FIG. 25, the detailed list of information retrieved from recently upserted data may be presented in a signal group field selection "employees on leave" 2512. The employees may be identified by various data fields and referred to in an organized and tabulated format.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EE- PROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 21 illustrates an example network element 2100, which may represent any of the above-described network components etc.

Figure 26:
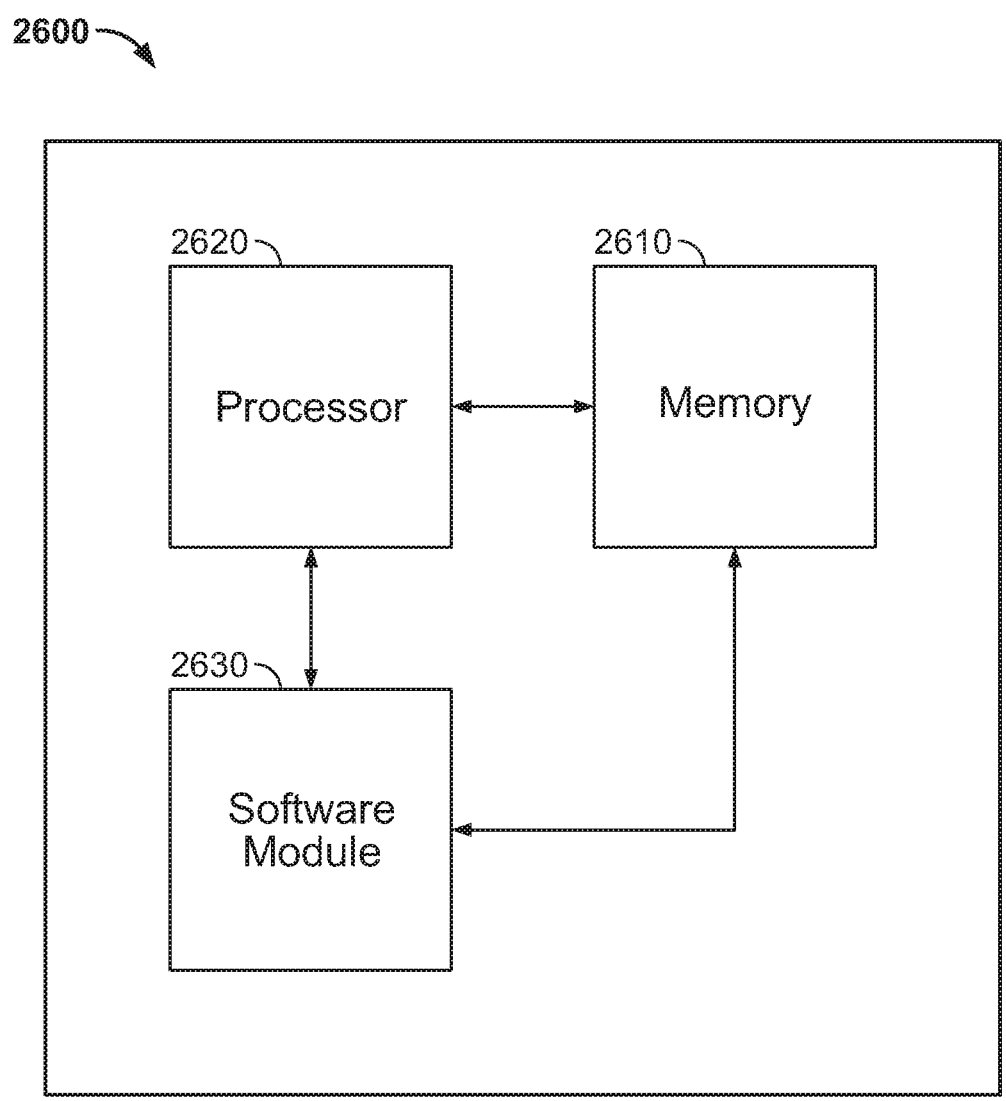
FIG. 26 illustrates an example network entity device configured to store instructions, software, and corresponding hardware for executing the same, according to example embodiments of the present application.

As illustrated in FIG. 26, a memory 2610 and a processor 2620 may be discrete components of the network entity 2600 that are used to execute an application or set of operations. The application may be coded in software in a computer language understood by the processor 2620, and stored in a computer readable medium, such as, the memory 2610. The computer readable medium may be a non-transitory computer readable medium that includes tangible hardware components in addition to software stored in memory. Furthermore, a software module 2630 may be another discrete entity that is part of the network entity 2600, and which contains software instructions that may be executed by the processor 2620. In addition to the above noted components of the network entity 2600, the network entity 2600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 20 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:
1. A method, comprising:
 identifying at least one data object for migration to a remote cloud application server;

identifying a plurality of field groups linked to the at least one data object, each of the plurality of field groups comprising at least one data field, wherein a field group is linked to content of the at least one data object by a pointer;

receiving, via an application programming interface, the plurality of field groups at the remote cloud application server;

identifying at least one of the received plurality of field groups for migration to the remote cloud application server;

generating a simple data set, wherein the simple data set is loadable into the remote cloud application server to migrate content of the identified at least one data object;

converting a format of the identified at least one field group to a format associated with the simple data set, the conversion including translating the linking of (i) the identified field group to the content of the at least one data object to (ii) formatting of the simple data set such that the simple data set includes a subset of data of the at least one data object, the data not included in the subset of data being derivable from the subset of data;

modifying the simple data set to include the at least one data field; and migrating the modified simple data set to the remote cloud application server.

2. The method of claim 1, wherein the modifying the simple data set includes modifying the simple data set to include a predefined number of data fields of the at least one field group, wherein the predefined number is at least one.

3. The method of claim 2, wherein the identified at least one field group includes at least two data fields and the predefined number of data fields is fewer than an original number of data fields of the at least one field group.

4. The method of claim 1, wherein the at least one field group identifies at least one data column in at least one of a database file and a spreadsheet file.

5. The method of claim 4, wherein the at least one field group identifies a plurality of data columns from a plurality of different corresponding database files or spreadsheet files.

6. The method of claim 1, wherein converting a format of the at least one field group to a format associated with a simple data set of the cloud application further comprises
identifying a total number of available data columns; and
reducing a number of actual data columns to a lesser number of actual data columns prior to converting the format of the at least one field group.

7. The method of claim 1, further comprising upserting the at least one data field of the at least one field group by receiving updated data in a key field after the at least one field group has been received, wherein the key field is a designated field that receives updates automatically as new data is inserted into at least one existing data field.

8. The method of claim 1, further comprising prior to the identifying the at least one of the plurality of field groups, receiving the plurality of field groups at a data formatting application operated on the remote cloud application server.

9. The method of claim 1, further comprising converting the simple data set to a complex form for loading into the remote cloud application server.

10. The method of claim 1, further comprising outputting a query for the at least one data object, wherein the query is based on the simple data set format.

11. The method of claim 1, wherein the receiving the plurality of field groups via the application programming interface includes determining that the format of data in the received plurality of field groups is compatible with the remote cloud application server.

12. An apparatus, comprising:
a processor configured to:
identify at least one data object for migration to a remote cloud application server;
identify a plurality of field groups linked to the at least one data object, each of the plurality of field groups comprising at least one data field, wherein a field group is linked to content of the at least one data object by a pointer
receive, via an application programming interface, the plurality of field groups at the remote cloud application server;
identify at least one of the received plurality of field groups for migration to the remote cloud application server;
generate a simple data set, wherein the simple data set is loadable into the remote cloud application server to migrate content of the identified at least one data object;
convert a format of the identified at least one field group to a format associated with the simple data set, the conversion including translating the linking of (i) the identified field group to the content of the at least one data object to (ii) formatting of the simple data set such that the simple data set includes a subset of data of the at least one data object, the data not included in the subset of data being derivable from the subset of data;
modify the simple data set to include the at least one data field; and
migrate the modified simple data set to the remote cloud application server.

13. The apparatus of claim 12, wherein the modifying the simple data set includes modifying the simple data set to include a predefined number of data fields of the at least one field group, wherein the predefined number is at least one.

14. The apparatus of claim 13, wherein the identified at least one field group includes at least two data fields and the predefined number of data fields is fewer than an original number of data fields of the at least one field group.

15. The apparatus of claim 12, wherein the at least one field group identifies at least one data column in at least one of a database file and a spreadsheet file.

16. The apparatus of claim 15, wherein the at least one field group identifies a plurality of data columns from a plurality of different corresponding database files or spreadsheet files.

17. The apparatus of claim 12, wherein when the processor converts a format of the at least one field group to a format associated with a simple data set of the cloud application, the processor also identifies a total number of available data columns, and reduces a number of actual data columns to a lesser number of actual data columns prior to the format of the at least one field group being converted.

18. The apparatus of claim 12, wherein the processor is also configured to upsert the at least one data field of the at least one field group by receiving updated data in a key field after the at least one field group has been received, wherein the key field is a designated field that receives updates automatically as new data is inserted into at least one existing data field.

19. A non-transitory computer readable storage medium configured to store instructions that when executed cause a processor to perform:

identifying at least one data object for migration to a remote cloud application server;

identifying a plurality of field groups linked to the at least one data object, each of the plurality of field groups comprising at least one data field, wherein a field group is linked to content of the at least one data object by a pointer;

receiving, via an application programming interface, the plurality of field groups at the remote cloud application server;

identifying at least one of the received plurality of field groups for migration to the remote cloud application server;

generating a simple data set, wherein the simple data set is loadable into the remote cloud application server to migrate content of the identified at least one data object;

converting a format of the identified at least one field group to a format associated with the simple data set, the conversion including translating the linking of (i) the identified field group to the content of the at least one data object to (ii) formatting of the simple data set such that the simple data set includes a subset of data of the at least one data object, the data not included in the subset of data being derivable from the subset of data;

modifying the simple data set to include the at least one data field; and migrating the modified simple data set to the remote cloud application server.

20. The non-transitory computer readable storage medium of claim 19, wherein the modifying the simple data set includes modifying the simple data set to include a predefined number of data fields of the at least one field group, wherein the predefined number is at least one.

21. The non-transitory computer readable storage medium of claim 20, wherein the identified at least one field group includes at least two data fields and the predefined number of data fields is fewer than an original number of data fields of the at least one field group.

22. The non-transitory computer readable storage medium of claim 19, wherein the at least one field group identifies at least one data column in at least one of a database file and a spreadsheet file.

23. The non-transitory computer readable storage medium of claim 22, wherein the at least one field group identifies a plurality of data columns from a plurality of different corresponding database files or spreadsheet files.

24. The non-transitory computer readable storage medium of claim 19, wherein converting a format of the at least one field group to a format associated with a simple data set of the cloud application further comprises:

identifying a total number of available data columns;

reducing a number of actual data columns to a lesser number of actual data columns prior to converting the format of the at least one field group; and wherein the processor is further configured to perform;

upserting the at least one data field of the at least one field group by receiving updated data in a key field of a data formatting application after the at least one field group has been received, wherein the key field is a designated field in the data formatting application that receives updates automatically as new data is inserted into at least one existing data field.

* * * * *